(12) United States Patent
Tsuchida

(10) Patent No.: US 8,573,843 B2
(45) Date of Patent: Nov. 5, 2013

(54) TEMPERATURE MEASURING DEVICE

(75) Inventor: Masato Tsuchida, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 8 days.

(21) Appl. No.: 13/282,043

(22) Filed: Oct. 26, 2011

(65) Prior Publication Data

US 2012/0114013 A1 May 10, 2012

(30) Foreign Application Priority Data

Nov. 5, 2010 (JP) ................................ 2010-248622
Nov. 5, 2010 (JP) ................................ 2010-248623

(51) Int. Cl.
G01K 7/00 (2006.01)
G01K 17/00 (2006.01)
G01K 3/00 (2006.01)

(52) U.S. Cl.
USPC ............. 374/185; 374/29; 374/163; 374/164; 374/183; 374/112

(58) Field of Classification Search
USPC ........... 374/185, 163, 164, 166, 29, 110, 112, 374/183, 208
See application file for complete search history.

(56) References Cited

U.S. PATENT DOCUMENTS

| 7,722,249 B2 * | 5/2010 | Kim et al. ...................... 374/208 |
| 2002/0150143 A1 | 10/2002 | Tokita et al. |
| 2012/0024833 A1 * | 2/2012 | Klewer et al. ................. 219/211 |

FOREIGN PATENT DOCUMENTS

| JP | 09126905 A | 5/1997 |
| JP | 2002372464 A | 12/2002 |
| JP | 2007315917 A | 12/2007 |
| JP | 2010197244 A | 9/2010 |

* cited by examiner

*Primary Examiner* — Lisa Caputo
*Assistant Examiner* — Brandi N Hopkins
(74) *Attorney, Agent, or Firm* — Sughrue Mion, PLLC

(57) ABSTRACT

Provided is a temperature measuring device capable of continuously measuring a body temperature without imposing a load on a subject or a measurer. The temperature measuring device includes: a temperature measuring unit (10, 210) to be attached to an object to be measured, including a temperature measuring unit-side temperature sensing element (21, 221) and a first coil (11, 211); and a power supplying unit (30, 230) including a second coil (31, 231), for supplying power to the temperature measuring unit (10, 210), in which the temperature measuring unit (10, 210) and the power supplying unit (30, 230) are formed integrally with each other.

19 Claims, 25 Drawing Sheets

TEMPERATURE MEASURING DEVICE

CROSS-REFERENCE TO RELATED APPLICATION

The present application claims priority from Japanese application JP 2010-248622 filed on Nov. 5, 2010 and Japanese application JP 2010-248623 filed on Nov. 5, 2010, the content of which is hereby incorporated by reference into this application.

BACKGROUND OF THE INVENTION

1. Field of the Invention

The present invention relates to a temperature measuring device for measuring a temperature of a living body, in particular, a temperature measuring device capable of achieving continuous measurement of a temperature with ease.

2. Description of the Related Art

Up to now, in a hospital and the like, body temperatures of patients are measured and managed on a regular basis. In general, to measure the body temperature, a clinical thermometer is attached to a body part to be measured of a subject and held still for a predetermined time until the measurement is completed. Further, it is important to measure a deep body temperature in body temperature management, monitoring of a bloodstream state, and the like during a surgical operation. However, it is difficult to measure the deep body temperature in a normal state. In general, in order to measure the body temperature, a surface temperature of a living body, which is different from a deep body temperature thereof in an ordinary state, is measured, and hence in a case where the measurement is performed with the clinical thermometer held under the armpit, it is necessary to wait until the deep body temperature and the surface temperature reach equilibrium with the armpit closed. Further, a clinical thermometer is commercially available which predicts an equilibrium point by substituting a state of change in temperature until the deep body temperature and the surface temperature reach equilibrium into a formula and determines the equilibrium point as the body temperature. Further, after completing the measurement, a measurer needs to perform such work of confirming and recording a result of the measurement.

However, in a case where the subject is an infant or a seriously ill patient, it is difficult to keep the clinical thermometer attached to the body part to be measured, and it is not easy to perform accurate body temperature measurement. Further, a prediction type clinical thermometer may often produce a measurement result having a large error because the change in temperature from the start of the measurement becomes unstable in a case where the attachment is not stable or in a case where an environment has changed. Further, the work of confirming and recording the result of the measurement imposes a heavy load on the measurer, and it is desired that the recording be performed without bothering the measurer.

Against such a backdrop, for example, JP 09-126905 A discloses, in page 2 and FIG. 1, a body temperature pickup including a temperature sensing element that is brought into direct contact with the body of the subject and a body temperature measuring unit connected to the temperature sensing element via a lead wire. The body temperature pickup (clinical thermometer) disclosed in JP 09-126905 A includes the disc-like temperature sensing element having a self-adhesive pad and the body temperature measuring unit connected to the temperature sensing element via the lead wire. The temperature sensing element is connected to the body temperature measuring unit via the lead wire at all times, and a temperature (body temperature) detected by the temperature sensing element is measured. It is disclosed that this clinical thermometer allows the self-adhesive pad to be adhered on the body of the subject with ease, thereby being suitable for the measurement of the body temperature of the patient whose body is hard to stabilize.

Further, for example, JP 2010-197244 A discloses, in page 4 and FIG. 1, a body temperature measuring system including: a clinical thermometer having a wireless tag (wireless communication means) including a semiconductor body temperature sensor; and a portable data reader. Hereinafter, referring to FIG. 10, description is made of an outline of the conventional body temperature measuring system disclosed in JP 2010-197244 A. In FIG. 10, the conventional body temperature measuring system includes: a clinical thermometer (adhesive-type clinical thermometer including an antenna) 100 in which the wireless tag including the temperature sensor is located; and a data reader 110 that is portable for the measurer.

The clinical thermometer 100 has a body temperature tag 103, which serves as the wireless tag, sandwiched and fixed between a surface film 101 and a back film 102. The body temperature tag 103 is provided with an antenna unit 104 and a processing unit 105 including the temperature sensor.

Here, the body temperature tag 103 has power supplied to the processing unit 105 by receiving power supply from the data reader 110 via the antenna unit 104 (power supply by generation of an induced electromotive force caused by an electromagnetic wave; arrow A), and transmits temperature information measured by the temperature sensor to the data reader 110 via the antenna unit 104 (arrow B). This indicates that the body temperature tag 103 operates by receiving the power supply from the data reader 110 and hence does not need to have a power source built therein, which can achieve a smaller size and lighter weight.

Further, for example, JP 2002-372464 A discloses, in page 8 and FIG. 18, an electronic clinical thermometer that can estimate a deep body temperature by directly measuring a surface temperature of the living body in real time and calculating the deep body temperature based on a result thereof according to a heat conduction equation. Hereinafter, referring to FIGS. 24A and 24B, description is made of an outline of the conventional electronic clinical thermometer disclosed in JP 2002-372464 A.

FIG. 24A is a sectional view illustrating an internal structure of a probe of the conventional electronic clinical thermometer, in which a top surface and a side surface of a probe 300 are covered with a cover 301 formed of a metallic material or the like, and heat insulating materials 302*a* and 302*b* different in thermal conductivity are located adjacent to each other in a longitudinal direction below a cover top surface portion 301*a*. Further, temperature sensors 303*a* and 303*b* are located in contact with under surfaces of the heat insulating materials 302*a* and 302*b*, respectively. FIG. 24B illustrates a structure of the probe 300 viewed from the side of the cover top surface portion 301*a*. The temperature sensors 303*a* and 303*b* are each located in a center part of each of the heat insulating materials 302*a* and 302*b* having a substantially cuboid shape.

It is disclosed that in the measurement using the above-mentioned electronic clinical thermometer, by bringing the cover top surface portion 301*a* of the probe 300 into contact with a living body 310, a temperature and a change over time thereof of potions are measured, which are brought into contact with a living body surface via the heat insulating materials 302*a* and 302*b* different in thermal conductivity. Then, a known heat conduction equation is solved based on obtained temperature data, thereby allowing estimation of the deep temperature inside the living body.

Further, as another conventional technology, for example, JP 2007-315917 A discloses, in page 6 and FIG. 5, a deep temperature measuring device including a deep temperature probe and a communication display device. Hereinafter, referring to FIG. 25, description is made of an outline of the conventional deep temperature measuring device disclosed in JP 2007-315917 A.

In FIG. 25, IC tags 402 and 403 with temperature sensors are located inside a metallic material portion 401 of a deep temperature probe 400. Therefore, temperatures detected by the IC tags 402 and 403 with temperature sensors correspond to the temperature of the metallic material portion 401 (substantially the same as the outside air temperature). Further, a rigid foamed material 411 that is a heat insulating material is located as a layer below the metallic material portion 401, and IC tags 412 and 413 with temperature sensors are located inside the rigid foamed material 411. The rigid foamed material 411 is segmented into an area R1 having a height h1 and an area R2 having a height h2.

An electromagnetic wave coupling layer 404 and a wiring substrate 405 are located around the metallic material portion 401. The wiring substrate 405 is connected to a wiring from the respective IC tags with temperature sensors and allows communication with an external device. Further, an interval between the IC tags with temperature sensors that are located so as to be opposed to each other across the rigid foamed material 411 in a vertical direction is defined as follows. Assuming that the interval between the IC tags 402 and 412 with temperature sensors is set as d1 and the interval between the IC tags 403 and 413 with temperature sensors is set as d2, a relationship of d1>d2 is established between d1 and d2.

It is disclosed that under this condition, the IC tags 412 and 413 of the deep temperature probe 400 are brought into contact with a living body 420, temperatures at respective measurement points are measured by the respective IC tags with temperature sensors, and the deep body temperature is obtained by a calculation using a finite element method in two dimensions (cross-section). Further, the deep temperature probe 400 has a function of transmitting the result of the measurement to an external communication device in a wireless manner.

However, the clinical thermometer of JP 09-126905 A has a problem in that the lead wire connected to the temperature sensing element becomes a heat flow path and the temperature of the temperature sensing element itself is dissipated to the body temperature measuring unit via the lead wire to thereby make it difficult to measure a body temperature with accuracy.

Further, the body temperature measuring system of JP 2010-197244 A has a problem of a large restriction on the use in that an operable distance between the wireless tag and the data reader being short (on the order of 5 mm to 15 mm) inhibits the communication between the wireless tag and the data reader that are far apart from each other in a case where the subject having the wireless tag attached to the surface of his/her body wears thick clothes, a case where the subject is asleep with a blanket or a comforter, and other such cases. Further, if the output power of the wireless communication is raised in order to widen the operable distance, there arises a problem of an increase in power consumption and a crosstalk caused with respect to another wireless tag.

Further, in the probe of the conventional electronic clinical thermometer of JP 2002-372464 A, as illustrated in FIGS. 24A and 24B, the cover 301 made of metal, the heat insulating materials 302a and 302b different in thermal conductivity, and the temperature sensors 303a and 303b are integrally formed by being stacked one on another, and hence an outer shape of the probe is large and thick. It is not preferred that the probe be continuously attached to the body of the subject for the purpose of the continuous measurement of the body temperature because a large load is imposed on the subject. Further, the probe and a main body cost high because all functional parts are integrally formed, and hence disposal thereof after one use by being attached to the subject for the purpose of infection prevention or the like leads to a problem of excessive cost.

Further, in the deep temperature probe of the deep temperature measuring device of JP 2007-315917 A, as illustrated in FIG. 25, the metallic material portion 401 and the rigid foamed material 411 being the heat insulating material having different thicknesses are stacked one on the other, each of which is integrally formed with a plurality of IC tags, and hence the outer shape of the deep temperature probe is large and thick, which makes it difficult to continuously attach the probe to the subject. Further, the probe costs high because all functional parts including the IC tags are integrally formed, and hence disposal thereof after one use by being attached to the subject for the purpose of infection prevention or the like leads to a problem of excessive cost.

Further, in recent years, in order to continuously observe the patient's condition and immediately handle an abrupt change in the condition, there is a demand for the body temperature measurement that enables the body temperature of the patient to be continuously measured twenty-four hours a day and progress of the body temperature to be continuously grasped and stored. However, with the clinical thermometers of JP 09-126905 A and JP 2002-372464 A, even if the temperature sensing element can be continuously attached to the patient, the reading and recording of the body temperature need to be performed by the measurer beside the patient at every time in the same manner as in the conventional technology, thereby making it extremely difficult to correspond to the continuous measurement of the body temperature twenty-four hours a day.

Further, in the same manner, in the body temperature measuring system of JP 2010-197244 A, even if the wireless tag is continuously attached to the body of the subject, the actual body temperature measurement makes it necessary for the measurer to bring the data reader into close proximity to the wireless tag and perform a measurement operation, thereby making it extremely difficult to continuously measure the body temperature of the subject twenty-four hours a day.

Further, in the same manner, in the deep temperature measuring device of JP 2007-315917 A, the deep temperature probe needs to be manufactured into a considerably small size in order to be continuously attached to the subject. However, even if the probe can be manufactured into a small size, it is assumed that a wireless communication distance from the external communication device becomes extremely short due to a restriction on an antenna or a restriction on battery capacity, and the actual body temperature measurement makes it necessary for the measurer to bring a communication device into close proximity to the deep temperature probe and perform the measurement operation. Therefore, it is practically difficult to continuously measure the body temperature of the subject twenty-four hours a day.

SUMMARY OF THE INVENTION

It is an object of the present invention to solve the above-mentioned problems and to provide a temperature measuring device capable of continuously measuring a body temperature without imposing a load on a subject or a measurer.

In order to achieve the above-mentioned object, the temperature measuring device according to the present invention adopts the following structures.

(1) A temperature measuring device, including: a temperature measuring unit to be attached to an object to be measured, including a temperature measuring unit-side temperature sensing element and a first coil; and a power supplying unit including a second coil, for supplying power to the temperature measuring unit, in which the temperature measuring unit and the power supplying unit are formed integrally with each other.

(2) The temperature measuring device according to the aspect (1), in which the temperature measuring unit and the power supplying unit are integrally formed via a heat insulating portion.

(3) The temperature measuring device according to the aspect (2), in which the heat insulating portion and one of the temperature measuring unit and the power supplying unit are detachably attachable to each other.

(4) The temperature measuring device according to the aspect (2) or (3), in which the power supplying unit is connected in a wired manner to a main body including a power source.

(5) The temperature measuring device according to the aspect (2) or (3), in which the power supplying unit is integrated with a main body including a power source.

(6) The temperature measuring device according to the aspect (1), in which: the power supplying unit further includes a power supplying unit-side temperature sensing element; and the temperature measuring unit and the power supplying unit are stacked one on the other in a close contact state, and the temperature measuring unit-side temperature sensing element and the power supplying unit-side temperature sensing element are opposed to each other.

(7) The temperature measuring device according to the aspect (6), in which the temperature measuring unit and the power supplying unit are detachably attachable to each other.

(8) The temperature measuring device according to the aspect (6) or (7), in which the power supplying unit is connected to a main body including a power source.

(9) The temperature measuring device according to any one of the aspects (6) to (8), in which: the temperature measuring unit-side temperature sensing element has at least a part covered with a first thermal resistor; and the power supplying unit-side temperature sensing element has at least a part covered with a second thermal resistor.

(10) The temperature measuring device according to the aspect (9), in which, in a case where the temperature measuring unit and the power supplying unit are in the close contact state, the temperature measuring unit-side temperature sensing element and the power supplying unit-side temperature sensing element have a heat flow path formed therebetween by the first thermal resistor and the second thermal resistor.

(11) The temperature measuring device according to the aspect (9), in which: a surface of the power supplying unit-side temperature sensing element which is opposed to the temperature measuring unit-side temperature sensing element is exposed from the second thermal resistor; and in a case where the temperature measuring unit and the power supplying unit are in the close contact state, the temperature measuring unit-side temperature sensing element and the power supplying unit-side temperature sensing element have a heat flow path formed therebetween by the first thermal resistor.

(12) The temperature measuring device according to the aspect (9), in which: a surface of the temperature measuring unit-side temperature sensing element which is opposed to the power supplying unit-side temperature sensing element is exposed from the first thermal resistor; and in a case where the temperature measuring unit and the power supplying unit are in the close contact state, the temperature measuring unit-side temperature sensing element and the power supplying unit-side temperature sensing element have a heat flow path formed therebetween by the second thermal resistor.

(13) The temperature measuring device according to the aspect (9), in which: a surface of the temperature measuring unit-side temperature sensing element which is opposed to the power supplying unit-side temperature sensing element is exposed from the first thermal resistor; a surface of the power supplying unit-side temperature sensing element which is opposed to the temperature measuring unit-side temperature sensing element is brought into contact with a third thermal resistor; and in a case where the temperature measuring unit and the power supplying unit are in the close contact state, the temperature measuring unit-side temperature sensing element and the power supplying unit-side temperature sensing element have a heat flow path formed therebetween by the third thermal resistor.

(14) The temperature measuring device according to the aspect (9), in which: a surface of the temperature measuring unit-side temperature sensing element which is opposed to the power supplying unit-side temperature sensing element is brought into contact with the third thermal resistor; a surface of the power supplying unit-side temperature sensing element which is opposed to the temperature measuring unit-side temperature sensing element is exposed from the second thermal resistor; and in a case where the temperature measuring unit and the power supplying unit are in the close contact state, the temperature measuring unit-side temperature sensing element and the power supplying unit-side temperature sensing element have a heat flow path formed therebetween by the third thermal resistor.

(15) The temperature measuring device according to the aspect (9), in which: a surface of the temperature measuring unit-side temperature sensing element which is opposed to the power supplying unit-side temperature sensing element is brought into contact with a first magnetic substance; a surface of the power supplying unit-side temperature sensing element which is opposed to the temperature measuring unit-side temperature sensing element have a third thermal resistor and a second magnetic substance stacked one on the other; and in a case where the temperature measuring unit and the power supplying unit are in the close contact state, the temperature measuring unit-side temperature sensing element and the power supplying unit-side temperature sensing element have a heat flow path formed therebetween by the third thermal resistor.

(16) The temperature measuring device according to the aspect (9), in which: a surface of the temperature measuring unit-side temperature sensing element which is opposed to the power supplying unit-side temperature sensing element has a concave portion formed by the first thermal resistor; a surface of the power supplying unit-side temperature sensing element which is opposed to the temperature measuring unit-side temperature sensing element is brought into contact with a third thermal resistor including a convex portion that protrudes from the second thermal resistor; and in a case where the temperature measuring unit and the power supplying unit are in the close contact state, the convex portion of the third thermal resistor is fitted into the concave portion of the first thermal resistor, and the temperature measuring unit-side temperature sensing element and the power supplying unit-side temperature sensing element have a heat flow path formed therebetween by the third thermal resistor.

(17) The temperature measuring device according to the aspect (9), in which: a surface of the temperature measuring unit-side temperature sensing element which is opposed to the power supplying unit-side temperature sensing element has a concave portion formed by the first thermal resistor; in a surface of the power supplying unit-side temperature sensing element which is opposed to the temperature measuring unit-side temperature sensing element, a third thermal resistor and the first thermal resistor are stacked one on another, and the stacked first thermal resistor includes a convex portion that protrudes from the second thermal resistor; and in a case where the temperature measuring unit and the power supplying unit are in the close contact state, the convex portion of the first thermal resistor is fitted into the concave portion of the first thermal resistor, and the temperature measuring unit-side temperature sensing element and the power supplying unit-side temperature sensing element have a heat flow path formed therebetween by the third thermal resistor and the first thermal resistor including the convex portion.

(18) The temperature measuring device according to any one of the aspects (10) to (17), in which: the temperature measuring unit-side temperature sensing element is thermally coupled directly to a surface of the object to be measured; and the power supplying unit-side temperature sensing element is thermally coupled to the object to be measured via the heat flow path.

(19) The temperature measuring device according to any one of the aspects (13) to (17), in which the third thermal resistor has a thermal conductivity higher than any one of thermal conductivities of the first thermal resistor and the second thermal resistor.

According to the above-mentioned aspect (1) of the present invention, the heat flow path such as a lead wire does not exist between the temperature measuring unit-side temperature sensing element located in the temperature measuring unit and the power supplying unit, and even in a case where a measuring device main body is connected to the power supplying unit, the heat of the temperature measuring unit is not transmitted to the main body, which allows the temperature measuring unit to measure the body temperature of the subject with high precision. Further, the temperature measuring unit and the power supplying unit are integrally formed and include power supply means using coils to supply power in a contactless manner, and hence it is possible to obtain a thin and lightweight temperature measuring device having a simple structure. Accordingly, the temperature measuring device can be continuously attached because the temperature measuring device does not get in the way and brings little discomfort even if being attached to the body of the subject.

Further, according to the above-mentioned aspect (2) of the present invention, the temperature measuring unit and the power supplying unit are integrally formed via the heat insulating portion, and hence the temperature measuring unit and the power supplying unit have such a positional relationship as to be located in extremely close proximity. Therefore, even if power from the power supplying unit is small, the necessary and sufficient power can be transmitted to the temperature measuring unit through the coils. Further, in the same manner, temperature information obtained from the temperature measuring unit can be transmitted to the power supplying unit through the coils with small power, and hence it is possible to transmit information that does not require distinction from another temperature measuring device. Therefore, it is possible to achieve simplification and power saving of communication means of the temperature measuring unit and the power supplying unit.

Further, according to the above-mentioned aspect (3) of the present invention, the temperature measuring unit can be disposed of after one use.

Further, according to the above-mentioned aspect (4) or (5) of the present invention, temperature measurement can be performed by connecting the power supplying unit to the measuring device main body. Therefore, the continuous measurement of the body temperature of the subject can be achieved, and the progress of the body temperature of the subject can be measured twenty-four hours a day. Accordingly, it is possible to grasp an abrupt change in condition of the subject, the long-term progress of the condition, and the like, which enables more suitable medical care to be carried out for the subject.

Note that, according to the above-mentioned aspect (4) of the present invention, the power supplying unit and the measuring device main body can be connected to each other via a cable, and when the measuring device main body is detached, it is possible to separate the temperature measuring unit and the power supplying unit.

Further, according to the above-mentioned aspect (6) of the present invention, the heat flow path generated by a predetermined thermal resistor is formed between a first temperature sensing element and a second temperature sensing element, and the temperatures of a living body in cases where its heat passes and does not pass through the heat flow path can be measured by the two temperature sensing elements to estimate a deep body temperature. Therefore, it is possible to obtain a high-precision temperature measuring device capable of measuring the deep body temperature of the subject in a short period of time.

Further, according to the above-mentioned aspect (7) of the present invention, the temperature measuring unit and the power supplying unit are detachably attachable to each other and perform contactless communication by using the coils, which eliminates the need for an electrode used to supply power or transmit information. In particular, it is possible to easily obtain a waterproof structure of the temperature measuring unit, and the number of functional parts is small, which results in low cost. Therefore, the temperature measuring unit that is brought into direct contact with a skin of the subject can be disposed of after one use, and hence it is possible to provide a temperature measuring device that is excellent in sanitation management such as infection prevention and high in usability.

Further, according to the above-mentioned aspect (8) of the present invention, the temperature measurement can be performed by connecting the power supplying unit to the measuring device main body. Therefore, the continuous measurement of the body temperature of the subject can be achieved, and the progress of the body temperature of the subject can be measured twenty-four hours a day. Accordingly, it is possible to grasp an abrupt change in condition of the subject and the long-term progress of the condition, which enables more suitable medical care to be carried out for the subject.

Further, according to the above-mentioned aspects (9) to (19) of the present invention, the temperature measuring unit and the power supplying unit are integrally stacked one on the other, and hence the temperature measuring unit and the power supplying unit have such a positional relationship as to be located in extremely close proximity. Therefore, even if the power from the power supplying unit is small, the necessary and sufficient power can be transmitted to the temperature measuring unit through the coils. Further, in the same manner, the temperature information obtained from the temperature measuring unit can be transmitted to the power supplying unit through the coils with small power, which allows information transmission that does not require distinction from another temperature measuring device. As a result, it is possible to achieve simplification and power saving of the communication means of the temperature measuring unit and the power supplying unit.

DETAILED DESCRIPTION OF THE INVENTION

Hereinafter, embodiments of the present invention are described in detail with reference to the accompanying drawings.

[Feature of Each Embodiment]

A first embodiment has a feature of, as a basic form of a temperature measuring device in which a lead wire connected to a temperature sensing element does not become a heat flow path, having a simple structure that can be attached to a subject without bringing discomfort. A second embodiment has a feature that the structure of the first embodiment is connected to a main body unit including a power source via a cable. A third embodiment has a feature that the structure of the first embodiment is integrally formed with the main body unit including the power source by being directly connected thereto.

A fourth embodiment has a feature of, as a basic form of a temperature measuring device suitable for disposable use, including two temperature sensing elements and has a feature that the heat flow path generated by a first thermal resistor and a second thermal resistor is formed between the two temperature sensing elements. A fifth embodiment has a feature that, compared with the fourth embodiment, the heat flow path is formed only by the first thermal resistor. A sixth embodiment has a feature that, compared with the fourth embodiment, a temperature measuring unit is thin and the heat flow path is formed by the second thermal resistor. A seventh embodiment has a feature that, compared with the fourth embodiment, a temperature measuring unit is thin and the heat flow path is formed by a third thermal resistor.

An eighth embodiment has a feature that, compared with the fourth embodiment, the heat flow path is formed only by the third thermal resistor connected to a first temperature sensing element. A ninth embodiment has a feature that, compared with the fourth embodiment, the heat flow path is formed when magnetic substances bring the temperature measuring unit and a power supplying unit into close contact with each other. A tenth embodiment has a feature that, compared with the fourth embodiment, the heat flow path is formed by the third thermal resistor when a convex portion of the third thermal resistor is fitted into a concave portion of the first thermal resistor to bring the temperature measuring unit and the power supplying unit into close contact with each other. An eleventh embodiment has a feature that, compared with the fourth embodiment, the heat flow path is formed by the first and third thermal resistors when a convex portion of a power supplying unit-side first thermal resistor is fitted into a concave portion of the first thermal resistor to bring the temperature measuring unit and the power supplying unit into close contact with each other.

First Embodiment

Figure 1:
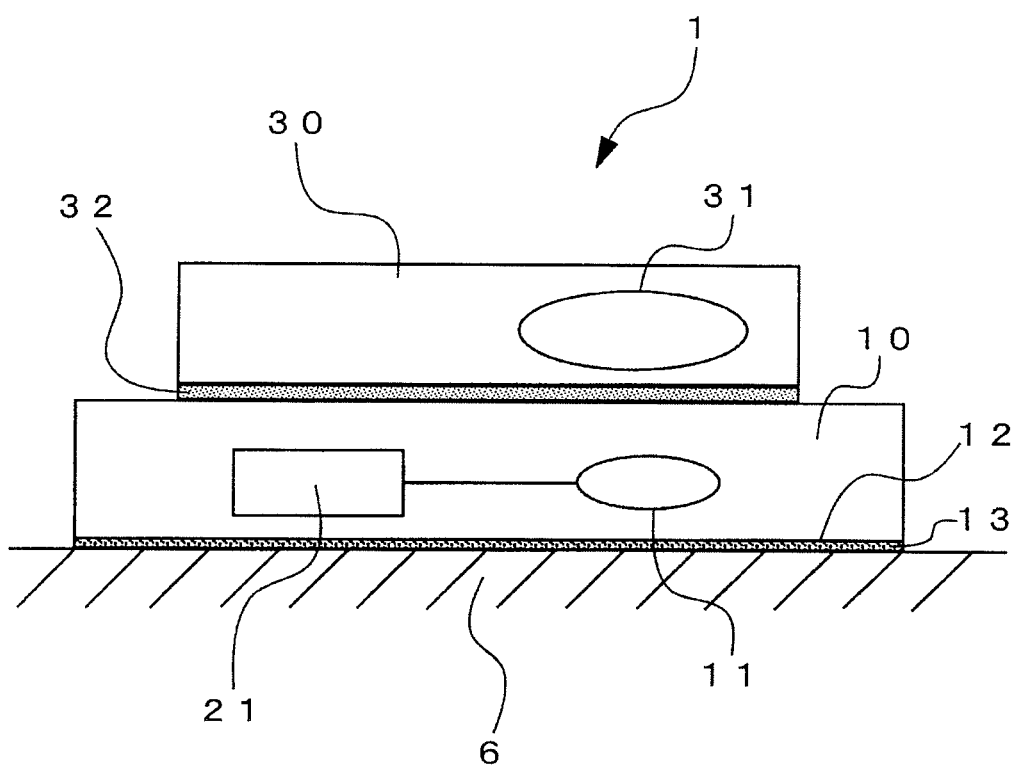
FIG. 1 is a schematic side view illustrating a basic structure of a temperature measuring device according to a first embodiment of the present invention.

[Description of Structure of Temperature Measuring Device According to First Embodiment: FIG. 1]

Referring to FIG. 1, description is made of a basic structure of the temperature measuring device according to the first embodiment. FIG. 1 illustrates a temperature measuring device 1 according to the first embodiment. The temperature measuring device 1 includes a temperature measuring unit 10 and a power supplying unit 30. The temperature measuring unit 10 has a function of measuring a body temperature by being brought into direct contact with a skin 6 of a subject whose body temperature is to be measured, and includes a first coil 11 and a temperature sensing element 21. In other words, the temperature sensing element 21 in this embodiment and in the second and third embodiments that are described later is a temperature measuring unit-side temperature sensing element that is located on the side of temperature measuring unit 10. Further, a sheet-like adhesive 13, which is used for adhering and attaching the temperature measuring unit 10 to the skin 6 of the subject, is installed on an under surface 12 of the temperature measuring unit 10.

Further, the power supplying unit 30 includes a second coil 31 for supplying power to the temperature measuring unit 10. A thin sheet-like heat insulating portion 32 that is high in thermal resistance is installed between the temperature measuring unit 10 and the power supplying unit 30, and the temperature measuring unit 10 and the power supplying unit 30 are integrally formed via the heat insulating portion 32. The heat insulating portion 32 is thus installed between the temperature measuring unit 10 and the power supplying unit 30, and hence even if the temperature measuring unit 10 and the power supplying unit 30 are integrally formed, the temperature measuring unit 10 and the power supplying unit 30 can maintain a thermally isolated state. Therefore, the heat flow path from the temperature measuring unit 10 to the power supplying unit 30 does not exist, and the temperature sensing element 21 of the temperature measuring unit 10 can measure the body temperature of the subject with high precision.

Further, the temperature measuring unit 10 and the power supplying unit 30 are formed to be thin so as not to bring discomfort to the subject when being attached to the subject. Further, the temperature measuring unit 10 and the power supplying unit 30 are integrally formed, and hence the first coil 11 built into the temperature measuring unit 10 and the second coil 31 built into the power supplying unit 30 are placed in proximity to each other. With this structure, power is supplied from the second coil 31 of the power supplying unit 30 to the first coil 11 of the temperature measuring unit 10 by an induced electromotive force caused by an electromagnetic wave, and a power supply efficiency thereof is satisfactorily excellent.

Further, in the same manner, temperature information obtained by the temperature sensing element 21 is transmitted from the first coil 11 of the temperature measuring unit 10 to the second coil 31 of the power supplying unit 30 by the induced electromotive force caused by the electromagnetic wave, and a transmission efficiency thereof is also satisfactorily excellent. Further, because, as described above, the temperature measuring unit 10 and the power supplying unit 30 are integrally formed, a positional relationship between the temperature measuring unit 10 and the power supplying unit 30 exhibits no displacement, and a positional relationship between the built-in first coil 11 and the built-in second coil 31 also exhibits no displacement. Accordingly, without fluctuation in the transmission/reception level of the first coil 11 and the second coil 31 due to the electromagnetic wave, it is possible to achieve extremely stable power supply and information transmission.

Figure 2A:
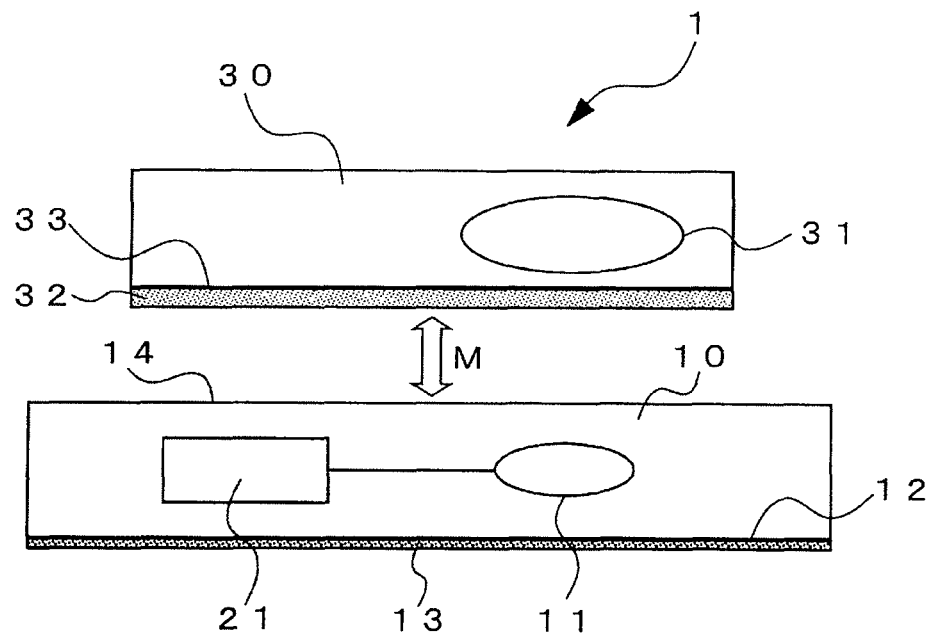
FIGS. 2A and 2B are schematic side views each illustrating a layout of a heat insulating material and a detachably attachable structure of the temperature measuring device according to the first embodiment of the present invention.
Figure 2B:
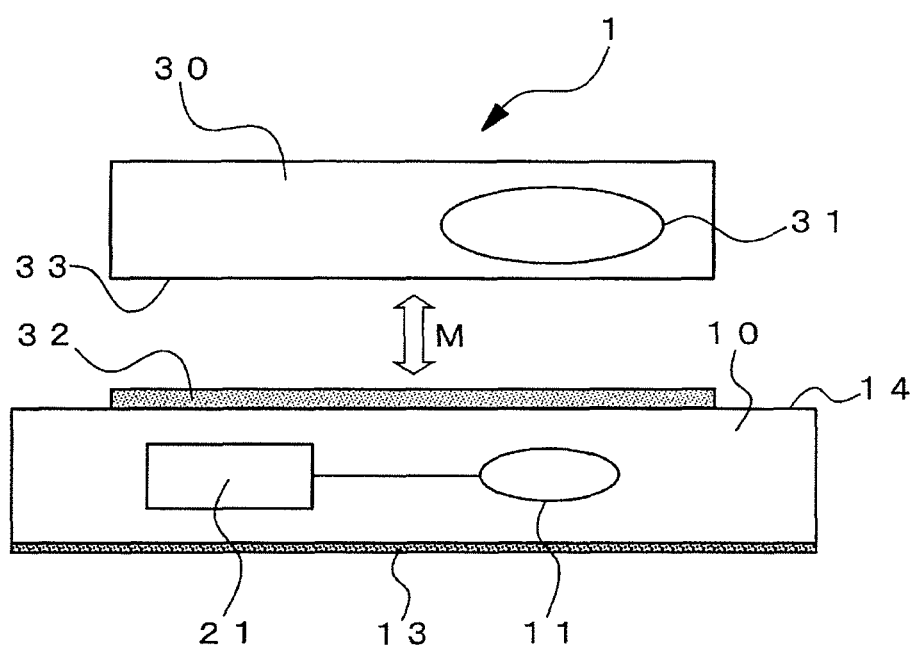

[Description of Layout of Heat Insulating Material and Detachably Attachable Structure of Temperature Measuring Device According to First Embodiment: FIG. 2A and FIG. 2B]

Next, referring to FIG. 2A and FIG. 2B, description is made of two layout examples of a heat insulating material and a detachably attachable structure of the temperature measuring device according to the first embodiment. In FIG. 2A, the heat insulating portion 32 is formed to be fixed to an under surface 33 of the power supplying unit 30. In addition, by predetermined means (not shown), as indicated by the arrow M, the heat insulating portion 32 is detachably attachable to a top surface 14 of the temperature measuring unit 10 which is opposed thereto.

With this structure, the temperature measuring unit 10 and the power supplying unit 30 are detachably attachable to each other. Here, in order to obtain the detachably attachable manner of the temperature measuring unit 10 and the power supplying unit 30, as an example, an adhesive (not shown) having a weak adhesion force is adhered on an entirety or part of the top surface 14 of the temperature measuring unit 10, or adhesive surface processing is processed on an entire surface or partial surface of the top surface 14 of the temperature measuring unit 10. Therefore, it is possible to fix the temperature measuring unit 10 and the power supplying unit 30 to each other by bringing the top surface 14 of the temperature measuring unit 10 and the heat insulating portion 32 on the under surface 33 of the power supplying unit 30 into close contact with each other.

Further, if the power supplying unit 30 is pulled apart from the temperature measuring unit 10 with a predetermined force in a state in which the temperature measuring unit 10 and the power supplying unit 30 are fixed to each other, it is possible to separate the power supplying unit 30 from the temperature measuring unit 10 because the adhesion force of the adhesive or the adhesive surface processing is weak. As a result, the temperature measuring unit 10 and the power supplying unit 30 are detachably attachable to each other.

Further, in the same manner, in FIG. 2B, the heat insulating portion 32 is formed so as to be fixed to the top surface 14 of the temperature measuring unit 10. In addition, by predetermined means (not shown), as indicated by the arrow M, the heat insulating portion 32 is detachably attachable to the under surface 33 of the power supplying unit 30. With this structure, the temperature measuring unit 10 and the power supplying unit 30 are detachably attachable to each other. Here, in order to obtain the detachably attachable manner of the temperature measuring unit 10 and the power supplying unit 30, in the same manner as illustrated in FIG. 2A, the adhesive (not shown) is adhered on an entire surface of the heat insulating portion 32 on the top surface 14 of the temperature measuring unit 10 or a part of the surface of the heat insulating portion 32, or the adhesive surface processing is processed on the entire surface of the heat insulating portion 32 or the part of the surface of the heat insulating portion 32.

Therefore, it is possible to fix the temperature measuring unit 10 and the power supplying unit 30 to each other by bringing the heat insulating portion 32 on the top surface 14 of the temperature measuring unit 10 and the under surface 33 of the power supplying unit 30 into close contact with each other. Further, if being pulled apart with a predetermined force, the power supplying unit 30 can be separated from the temperature measuring unit 10.

Here, it is preferred that the adhesive or the adhesive surface processing that causes the temperature measuring unit 10 and the power supplying unit 30 to be detachably attachable to each other be formed or processed on the top surface 14 of the temperature measuring unit 10 to be disposed of after one use. This is because, in spite of the fact that repeated attachment/detachment of the temperature measuring unit 10 and the power supplying unit 30 weakens the adhesion force of the adhesive, if the adhesive is formed or the adhesive surface processing is processed on the side of the temperature measuring unit 10 to be disposed of after one use, the adhesive is renewed each time the temperature measuring unit 10 is disposed of after one use to use a new temperature measuring unit 10, and a predetermined adhesion force can be maintained. Note that, there is no limitation to a place to form the adhesive or a place to process the adhesive surface processing.

Further, the detachably attachable manner of the temperature measuring unit 10 and the power supplying unit 30 may be obtained by installing magnets instead of the adhesive. In other words, in FIG. 2A or FIG. 2B, a thin magnet (not shown) is installed in the vicinity of the under surface 33 of the power supplying unit 30, and another thin magnet (not shown) is installed so as to be opposed to the above-mentioned magnet in the vicinity of the top surface 14 of the temperature measuring unit 10. Therefore, it is possible to obtain the detachably attachable manner of the temperature measuring unit 10 and the power supplying unit 30 by a magnetic force that causes the respective magnets to attract each other.

The temperature measuring unit 10 and the power supplying unit 30 can be thus structured so as to be detachably attachable to each other via the heat insulating portion 32, and hence the power supplying unit 30 can be attached/detached if necessary after the temperature measuring unit 10 is adhered and attached to the skin 6 of the subject (see FIG. 1) with the adhesive 13. Note that, means for attaching/detaching the temperature measuring unit 10 and the power supplying unit 30 is not limited to the method of using the adhesive or the magnets, and any method can be adopted as long as the method allows the attachment/detachment to be reliably performed.

Figure 3:
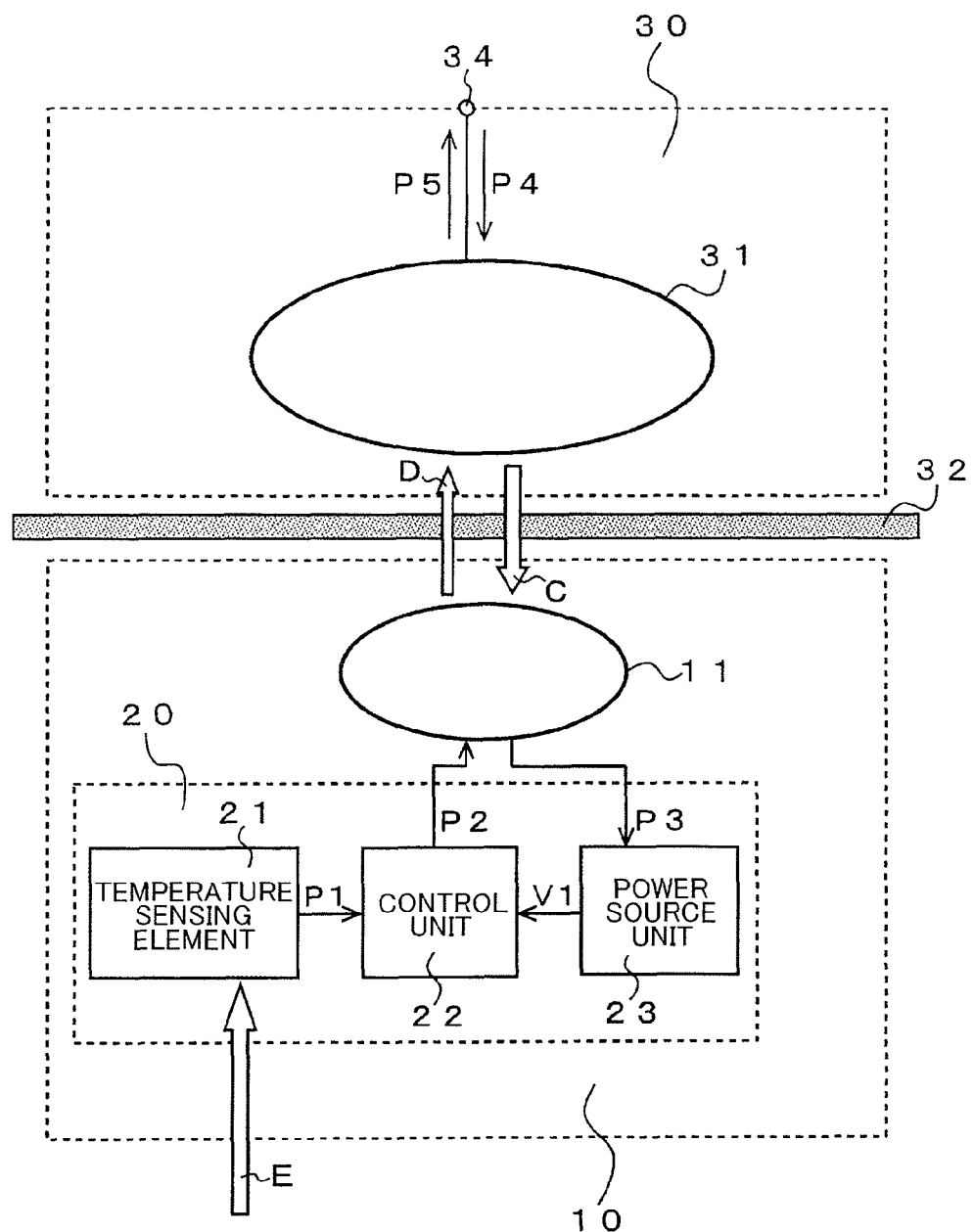
FIG. 3 is a block diagram illustrating an internal configuration of the temperature measuring device according to the first embodiment of the present invention.

[Description of Internal Configuration of Temperature Measuring Device According to First Embodiment: FIG. 3]

Next, referring to the block diagram of FIG. 3, description is made of an internal configuration of the temperature measuring device according to the first embodiment. In FIG. 3, the temperature measuring unit 10 of the temperature measuring device 1 is structured of a control IC 20 and the above-mentioned first coil 11. The control IC 20 is a semiconductor integrated circuit into which the above-mentioned temperature sensing element 21, a control unit 22, and a power source unit 23 are built.

The temperature sensing element 21 built into the control IC 20 is a semiconductor body temperature sensor, and may be installed in a position proximate to the under surface 12 of the temperature measuring unit 10 so that the temperature of the skin 6 of the subject (see FIG. 1), which is brought into close contact with the under surface 12 of the temperature measuring unit 10, is transmitted with high efficiency. A temperature signal P1, which is the temperature information on the subject, is output from the temperature sensing element 21. Note that, instead of being built into the control IC 20, the temperature sensing element 21 may be provided as a thermistor or the like that is installed outside the control IC 20.

The control unit 22 of the control IC 20 inputs the temperature signal P1 from the temperature sensing element 21, and outputs a high-frequency transmitting signal P2 based on the temperature information. The power source unit 23 of the control IC 20 receives a high-frequency electromotive force P3 as an input from the first coil 11, and outputs a power supply voltage V1 to supply power to the control unit 22.

The first coil 11 generates the induced electromotive force caused by the electromagnetic wave (arrow C) from the second coil 31 of the power supplying unit 30, and supplies the electromotive force P3 to the power source unit 23. Further, the first coil 11 receives the transmitting signal P2 as an input from the control unit 22 and radiates the electromagnetic wave (arrow D). Thus, the temperature measuring unit 10 is internally structured of only the first coil 11 and the control IC 20 and is therefore thin and lightweight.

The power supplying unit 30 is provided with the second coil 31 and an input/output terminal 34 that is connected to the second coil 31. The second coil 31 receives a high-frequency power signal P4 as an input supplied from an external portion to the input/output terminal 34, and radiates the electromagnetic wave (arrow C) to supply power to the temperature measuring unit 10. Further, the second coil 31 receives the electromagnetic wave (arrow D) generated by the first coil 11 of the temperature measuring unit 10, and outputs a receiving signal P5 to the input/output terminal 34. Note that, the input/output terminal 34 is connected to the main body unit of the temperature measuring device 1, but the main body unit is described later. Thus, the power supplying unit 30 is internally structured of only the second coil 31 and is therefore thin and lightweight.

Here, as described above, the heat insulating portion 32 for thermally isolating the temperature measuring unit 10 and the power supplying unit 30 from each other is installed therebetween, but the heat insulating portion 32 transmits the electromagnetic wave, and hence both the electromagnetic wave (arrow C) from the second coil 31 and the electromagnetic wave (arrow D) from the first coil 11 can be transmitted through the heat insulating portion 32 without being interfered. Therefore, power can be supplied from the power supplying unit 30 to the temperature measuring unit 10 in a wireless manner, and the temperature information can be transmitted from the temperature measuring unit 10 to the power supplying unit 30 in a wireless manner.

Note that, in this embodiment, the first coil 11 is one coil that serves to receive the electromagnetic wave (arrow C) for supplying power and to radiate the electromagnetic wave (arrow D) for the transmitting signal P2, but the present invention is not limited to this structure, and may be formed of two separate coils for the reception and the radiation. Further, in the same manner, the second coil 31 may be formed of two coils for the reception and the radiation. Therefore, a receiving coil and a radiating coil can each be formed to have an optimum shape in an optimum position, and therefore can improve their respective transmission efficiencies.

[Description of Operation of Temperature Measuring Device According to First Embodiment: FIG. 3]

Next, referring to FIG. 3, description is made of an operation of the temperature measuring device according to the first embodiment. In FIG. 3, when the power signal P4 is supplied from the external portion to the power supplying unit 30 in a state in which the temperature measuring unit 10 is attached to the skin 6 of the subject (see FIG. 1) and the temperature measuring unit 10 and the power supplying unit 30 are integrally coupled to each other, the electromagnetic wave (arrow C) is radiated from the second coil 31 of the power supplying unit 30. When the electromagnetic wave is transmitted to the first coil 11 of the temperature measuring unit 10, the induced electromotive force is generated, and the high-frequency electromotive force P3 is output from the first coil 11. The power source unit 23 of the control IC 20 receives the electromotive force P3 as an input and performs internal rectification thereof to output the direct-current power supply voltage V1.

Subsequently, the control unit 22 of the control IC 20 starts to operate when the power supply voltage V1 is applied thereto, and receives the temperature signal P1 as an input from the temperature sensing element 21. Here, because the temperature sensing element 21 is placed in proximity to the skin 6 of the subject (see FIG. 1), the body temperature (arrow E) from the subject is efficiently transmitted to the temperature sensing element 21, and the temperature sensing element 21 can convert the body temperature into the temperature signal P1 with high precision.

In addition, the control unit 22 outputs the high-frequency transmitting signal P2 including the temperature information obtained by the temperature signal P1 to the first coil 11. When the first coil 11 receives the transmitting signal P2 as an input and radiates the electromagnetic wave (arrow D), the electromagnetic wave is transmitted to the second coil 31 of the power supplying unit 30 to generate the induced electromotive force, and the receiving signal P5 is output from the second coil 31 to have the temperature information transmitted to the power supplying unit 30. In this manner, the temperature measuring unit 10 and the power supplying unit 30 can perform the power supply and the transmission of the temperature information in a contactless manner.

Further, as described above, because the heat insulating portion 32 is installed between the temperature measuring unit 10 and the power supplying unit 30, the heat flow path from the temperature measuring unit 10 to the power supplying unit 30 does not exist, and hence the body temperature of the subject (arrow E) is not transmitted to the power supplying unit 30, which allows the temperature sensing element 21 of the temperature measuring unit 10 to measure the body temperature of the subject with high precision.

Further, as described above, the heat insulating portion 32 between the temperature measuring unit 10 and the power supplying unit 30 has a thin sheet shape, and hence the temperature measuring unit 10 and the power supplying unit 30 are structured such that a physical distance therebetween is extremely short. Therefore, the contactless power supply and the transmission of the temperature information between the temperature measuring unit 10 and the power supplying unit 30 exhibit a high transmission efficiency because of the short distance, which can achieve a stable operation.

Figure 4A:
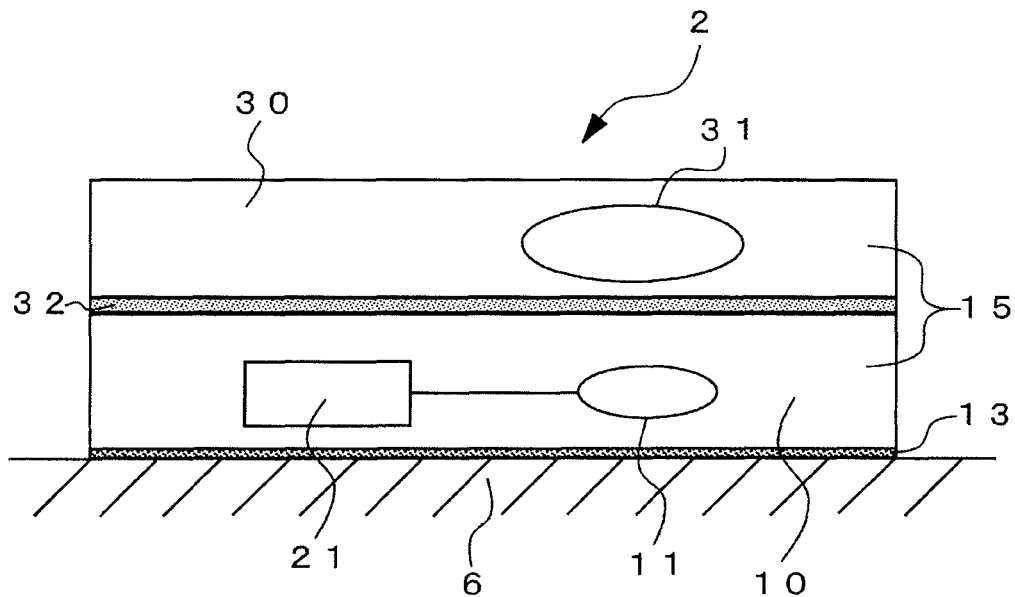
FIGS. 4A and 4B are schematic side views each illustrating a modified example of the first embodiment of the present invention.
Figure 4B:
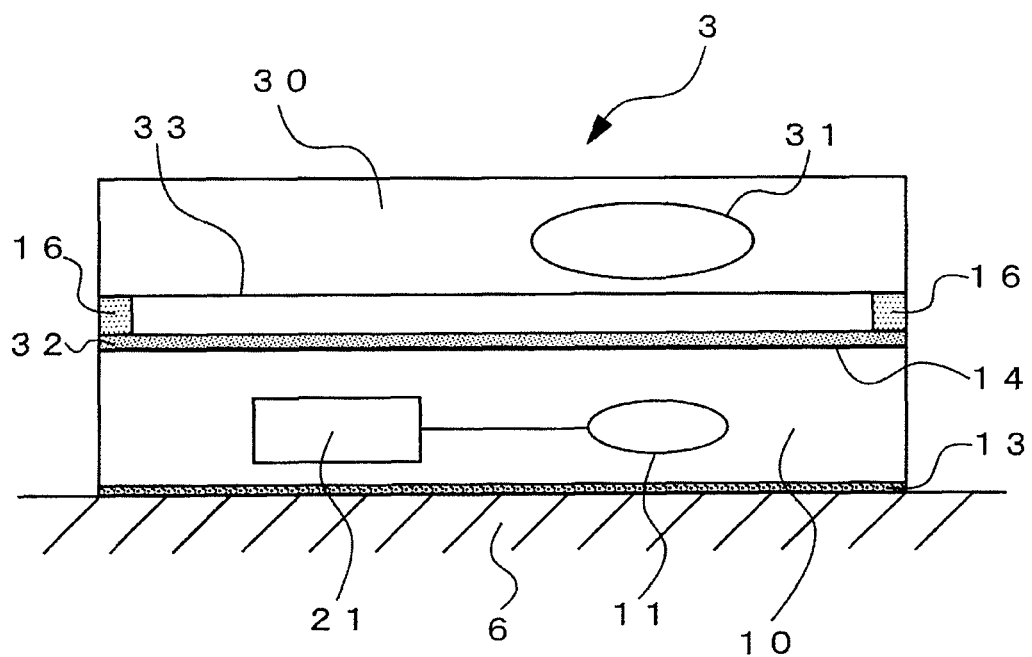

[Description of Structures of Modified Examples of First Embodiment: FIG. 4A and FIG. 4B]

Next, referring to FIG. 4A and FIG. 4B, description is made of structures of the temperature measuring device according to two modified examples of the first embodiment. Note that, the same components as those of the temperature measuring device 1 according to the first embodiment are denoted by the same reference numerals, and duplicate description thereof is omitted. FIG. 4A illustrates a temperature measuring device 2 according to a first modified example of the first embodiment. The temperature measuring unit 10 and the power supplying unit 30 of the temperature measuring device 2 are integrally molded with a resin member 15, and the heat insulating portion 32 is formed between the temperature measuring unit 10 and the power supplying unit 30.

With this structure, the temperature measuring unit 10 and the power supplying unit 30 of the temperature measuring device 2 are fixed to each other so as not to be separated, but have a thin structure, and therefore, do not bring large discomfort to the subject even when being attached to the skin 6 of the subject with the adhesive 13 on an under surface of the temperature measuring unit 10. Further, the temperature measuring unit 10 and the power supplying unit 30 are integrally formed to have a simple structure, which facilitates reduction in thickness. Note that, a basic structure inside the temperature measuring device 2 according to the first modified example of the first embodiment and functions thereof are the same as those of the above-mentioned temperature measuring device 1 according to the first embodiment, and hence description thereof is omitted.

Next, referring to FIG. 4B, description is made of a second modified example of the temperature measuring device according to the first embodiment. FIG. 4B illustrates a temperature measuring device 3 according to the second modified example of the first embodiment. The temperature measuring device 3 includes the temperature measuring unit 10 and the power supplying unit 30, and are integrally coupled to each other by a connecting member 16. Further, the heat insulating portion 32 is formed between the temperature measuring unit 10 and the power supplying unit 30. Note that, in FIG. 4B, the heat insulating portion 32 is installed on the top surface 14 of the temperature measuring unit 10, but the heat insulating portion 32 may be installed on the under surface 33 of the power supplying unit 30.

With this structure, the temperature measuring unit 10 and the power supplying unit 30 of the temperature measuring device 3 are fixed to each other by the connecting member 16 so as not to be separated, but have a thin structure, and therefore do not bring large discomfort to the subject even when being attached to the skin 6 of the subject with the adhesive 13 on the under surface of the temperature measuring unit 10. Note that, a basic structure inside the temperature measuring device 3 according to the second modified example of the first embodiment and functions thereof are the same as those of the above-mentioned temperature measuring device 1 according to the first embodiment, and hence description thereof is omitted. Further, by the fact that the connecting member 16 is installed between the temperature measuring unit 10 and the power supplying unit 30, it is conceivable that the thickness slightly increases compared with the above-mentioned temperature measuring device 2, but the slight increase exerts little influence on the functions or characteristics as the temperature measuring device.

Second Embodiment

Figure 5:
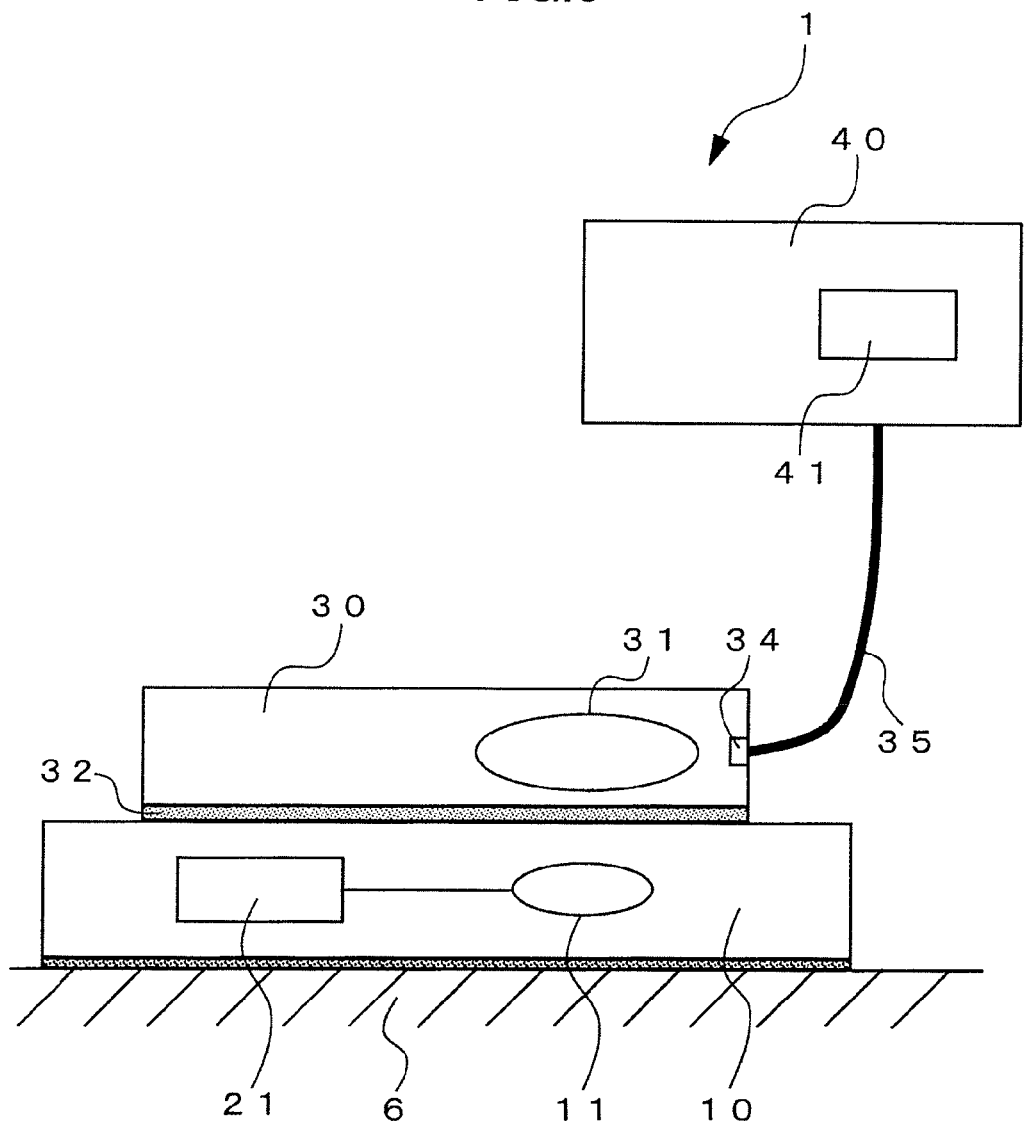
FIG. 5 is a schematic side view illustrating a temperature measuring device according to a second embodiment of the present invention.

[Description of Structure of Temperature Measuring Device According to Second Embodiment: FIG. 5]

Next, referring to FIG. 5, description is made of a structure of the temperature measuring device according to the second embodiment. Note that, the same components as those of the first embodiment are denoted by the same reference numerals, and duplicate description thereof is partially omitted. In FIG. 5, the temperature measuring unit 10 and the power supplying unit 30 of the temperature measuring device 1 are the same as those of the first embodiment described above except that the input/output terminal 34 of the power supplying unit 30 is connected to one end portion of a cable 35 being a wire and that the other end portion of the cable 35 is connected to a main body unit 40 of the temperature measuring device 1.

The main body unit 40 is provided therein with a power source 41 formed of a battery and the like, and a predetermined power is supplied from the power source 41 to the power supplying unit 30 through the cable 35. In this manner, the temperature measuring unit 10 and the power supplying unit 30 can operate by being connected to the main body unit 40 and supplied with power therefrom.

Figure 6:
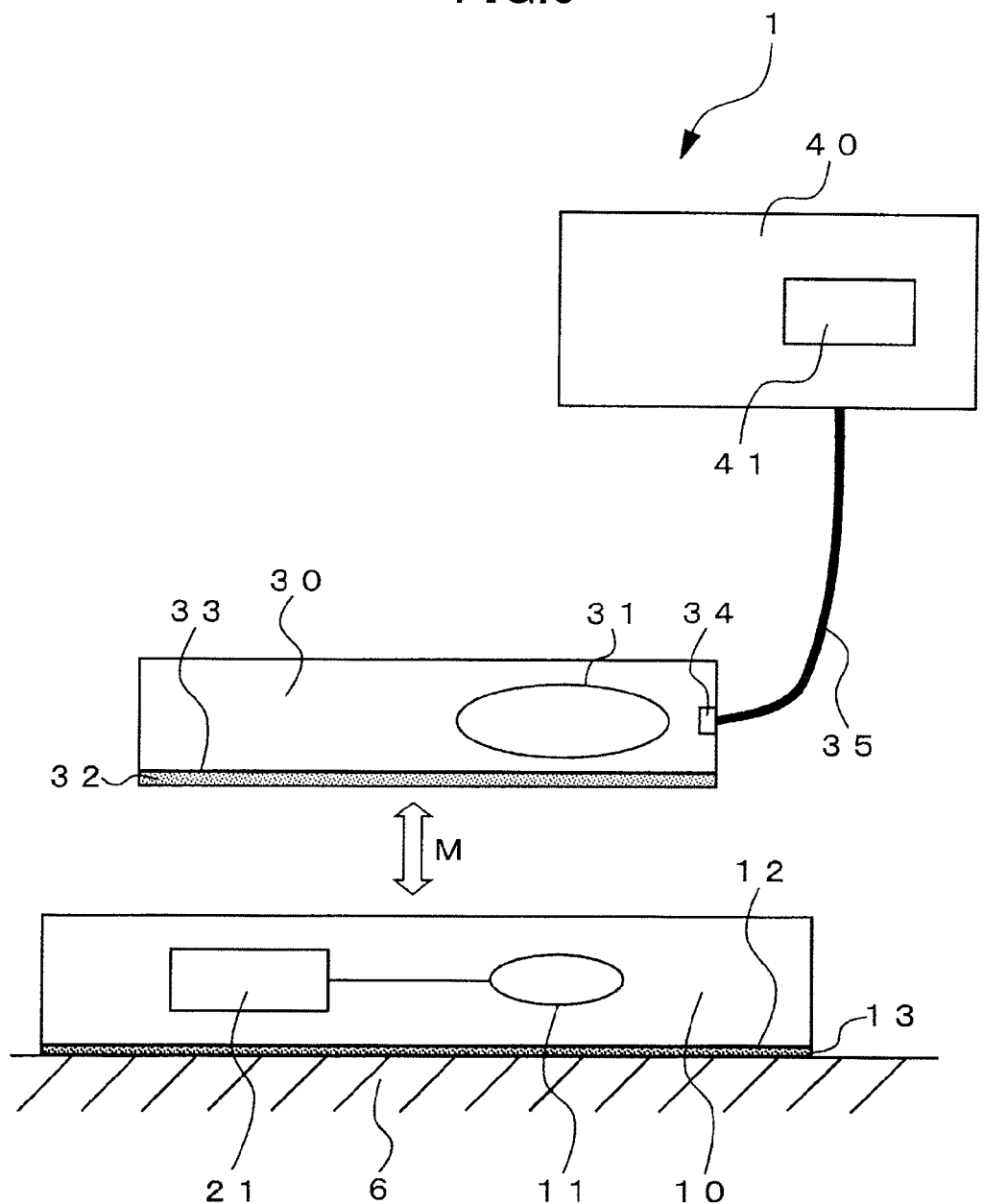
FIG. 6 is a schematic side view illustrating a detachably attachable structure of the temperature measuring device according to the second embodiment of the present invention.

[Description of Separation Structure of Temperature Measuring Device According to Second Embodiment: FIG. 6]

Next, referring to FIG. 6, description is made of a detachably attachable structure according to the second embodiment. In FIG. 6, in the same manner as in the above-mentioned first embodiment, the temperature measuring device 1 according to this embodiment is structured such that the temperature measuring unit 10 and the power supplying unit 30 are detachably attachable to each other as indicated by the arrow M and can be separated from each other as necessary. Here, the temperature measuring unit 10 can be continuously adhered on the skin 6 of the subject with the adhesive 13 of the under surface 12. Meanwhile, the heat insulating portion 32 is fixed to the under surface 33 of the power supplying unit 30, and the power supplying unit 30 is connected to the main body unit 40 via the cable 35.

In this manner, in the temperature measuring device 1 according to the second embodiment, the power supplying unit 30 and the main body unit 40 are connected to each other through the cable 35, and the temperature measuring unit 10 and the power supplying unit 30 are detachably attachable to each other. Therefore, the temperature measuring device 1 according to the second embodiment has two modes: a mode illustrated in FIG. 5 in which the temperature measuring unit 10 and the power supplying unit 30 are integrated with each other; and a mode illustrated in FIG. 6 in which the temperature measuring unit 10 and the power supplying unit 30 are separated from each other.

In other words, the temperature measuring unit 10 can be continuously attached to the skin 6 of the subject. In a case of measuring the body temperature of the subject, as illustrated in FIG. 5, the temperature measuring unit 10 and the power supplying unit 30 are integrated with each other to measure the body temperature. Further, in a case where the subject moves, a case where the body temperature does not need to be measured, and other such cases, as illustrated in FIG. 6, the temperature measuring unit 10 and the power supplying unit 30 can be separated from each other to attach only the thin temperature measuring unit 10 to the subject.

By thus providing a temperature measuring device with the two modes according to the presence/absence of the measurement of the body temperature, the temperature measuring unit 10 does not need to be attached to the subject repeatedly each time the measurement is started, and it is possible to provide the temperature measuring device that is high in usability for the subject and a measurer. Further, by the fact that the temperature measuring unit 10 and the power supplying unit 30 are detachably attachable to each other and that the temperature measuring unit 10 can be continuously attached to the subject, it is possible to maintain an attached position and an attached state of the temperature measuring unit 10 in a fixed level, and hence it is possible to obtain a body temperature measurement excellent in reproducibility in which the cause of unevenness in measurement is eliminated.

Figure 7:
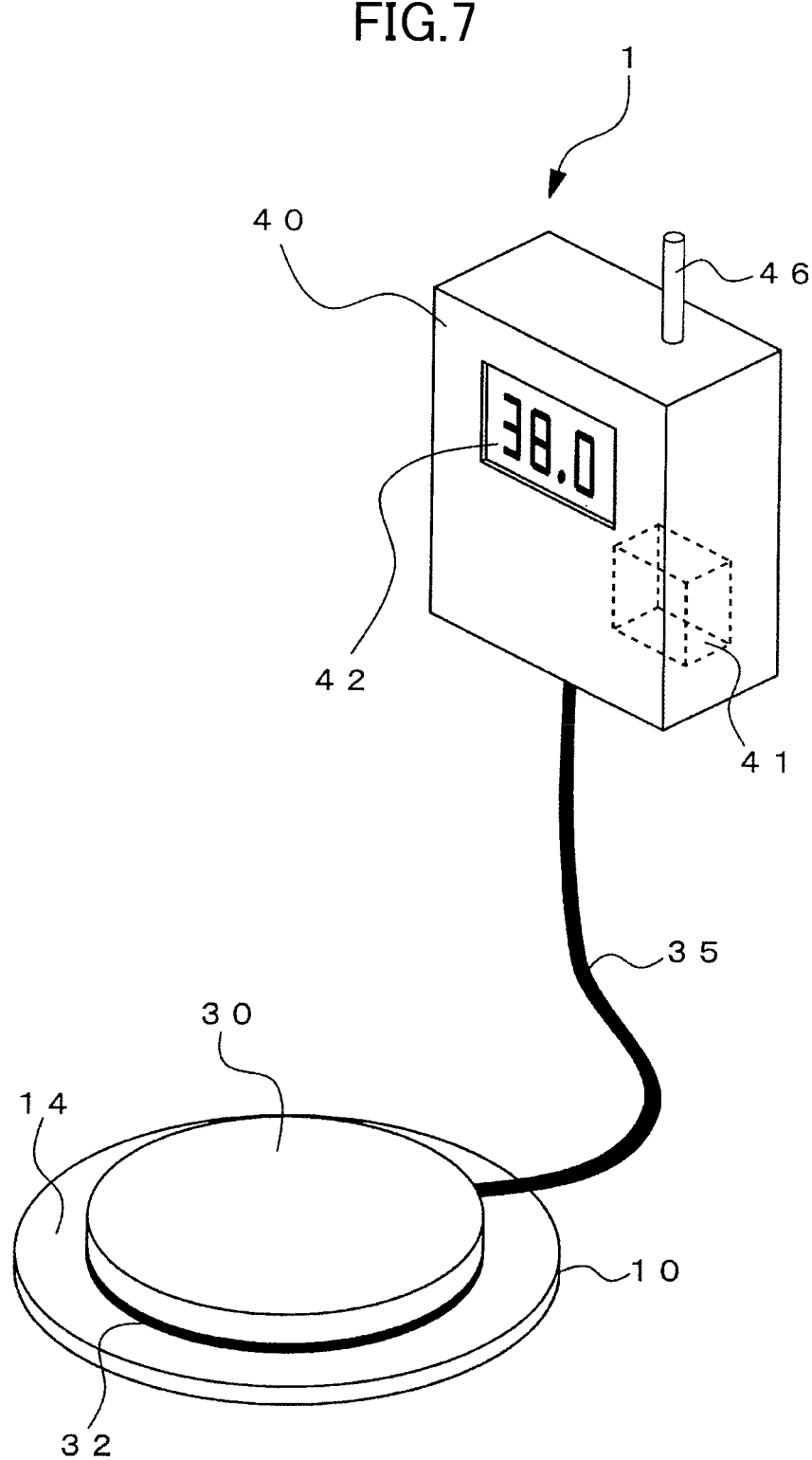
FIG. 7 is a perspective view illustrating a body temperature measurement example of the temperature measuring device according to the second embodiment of the present invention.

[Description of Body Temperature Measurement Example of Temperature Measuring Device According to Second Embodiment: FIG. 7]

Next, referring to FIG. 7, description is made of a body temperature measurement example according to the second embodiment. FIG. 7 illustrates a state in which the body temperature of the subject is being measured by using the temperature measuring unit 10 and the power supplying unit 30 that are integrated with each other as illustrated in FIG. 5 described above.

In FIG. 7, the temperature measuring unit 10 and the power supplying unit 30 are integrated with each other via the heat insulating portion 32. In other words, the power supplying unit 30 is brought into close contact with the top surface 14 of the temperature measuring unit 10 so as to sandwich the heat insulating portion 32 therebetween. Further, one end portion of the cable 35 is connected to a side surface of the power supplying unit 30, and the other end portion of the cable 35 is connected to the main body unit 40. The main body unit 40 includes the power source 41 (indicated by the broken lines) and a display unit 42 for displaying the measured body temperature. Note that, an antenna 46 for transmitting/receiving a signal to/from an external device (not shown) in a wireless manner is described later.

Here, when power is supplied from the power source 41 of the main body unit 40 to the power supplying unit 30 via the cable 35, as described above, the power is supplied from the second coil 31 of the power supplying unit 30 (see FIG. 1) to the first coil 11 of the temperature measuring unit 10 (see FIG. 1) by the electromagnetic wave. Further, when the temperature measuring unit 10 is supplied with the power, the temperature sensing element 21 (FIG. 1) measures the body temperature of the subject and transmits the temperature information from the first coil 11 to the second coil 31 of the power supplying unit 30, the temperature information transmitted to the power supplying unit 30 is transmitted to the main body unit 40 via the cable 35 and subjected to processing inside the main body unit 40, and the measured body temperature is displayed on the display unit 42.

In this manner, the temperature measuring unit 10 and the power supplying unit 30 that are attached to the subject are thin as illustrated in FIG. 7, and therefore can be continuously attached to the subject without bringing discomfort. Further, the cable 35 allows the main body unit 40 to be placed in a position apart from the temperature measuring unit 10 and the power supplying unit 30, thereby allowing the measurer (not shown) to read a result of the measurement at a predetermined distance apart from the subject. Note that, the cable 35 has an arbitrary length and can be set by the measurer to an optimum length that facilitates the operation of the main body unit 40.

Further, because, as described above, the temperature measuring unit 10 and the power supplying unit 30 are detachably attachable to each other, it is possible to prevent a load from being placed on the subject by separating the power supplying unit 30 from the temperature measuring unit 10 and attaching only the temperature measuring unit 10 to the subject when the body temperature measurement is not performed, and it is also possible to quickly restart the body temperature measurement by immediately integrating the power supplying unit 30 therewith at a time of remeasurement.

Further, the temperature measuring unit 10 can be manufactured at low cost with a simple structure, and hence the temperature measuring unit 10 that is brought into direct contact with the skin of the subject can be disposed of after one use on a subject-to-subject basis. Accordingly, it is possible to provide a temperature measuring device that is excellent in sanitation management such as infection prevention and high in usability.

Further, the power supplying unit 30 and the main body unit 40 that are separated from the temperature measuring unit 10 can be used for a subject to which another temperature measuring unit 10 is attached, and hence it is possible to improve a utilization rate of the device by reducing an unused state of the power supplying unit 30 and the main body unit 40 of the temperature measuring device 1.

Note that, in the second embodiment, as in the above-mentioned modified examples of the first embodiment (see FIG. 4A and FIG. 4B), even in a mode in which the temperature measuring unit 10 and the power supplying unit 30 are integrally fixed to each other, the temperature measuring unit 10 and the power supplying unit 30 can be used by being connected to the cable 35 and being supplied with power from the main body unit 40. In this case, it is not possible to attach the temperature measuring unit 10 solely to the subject, but the device can be made further thinner because of a simple structure and suitable for the subject who needs the continuous measurement at all times.

Figure 8:
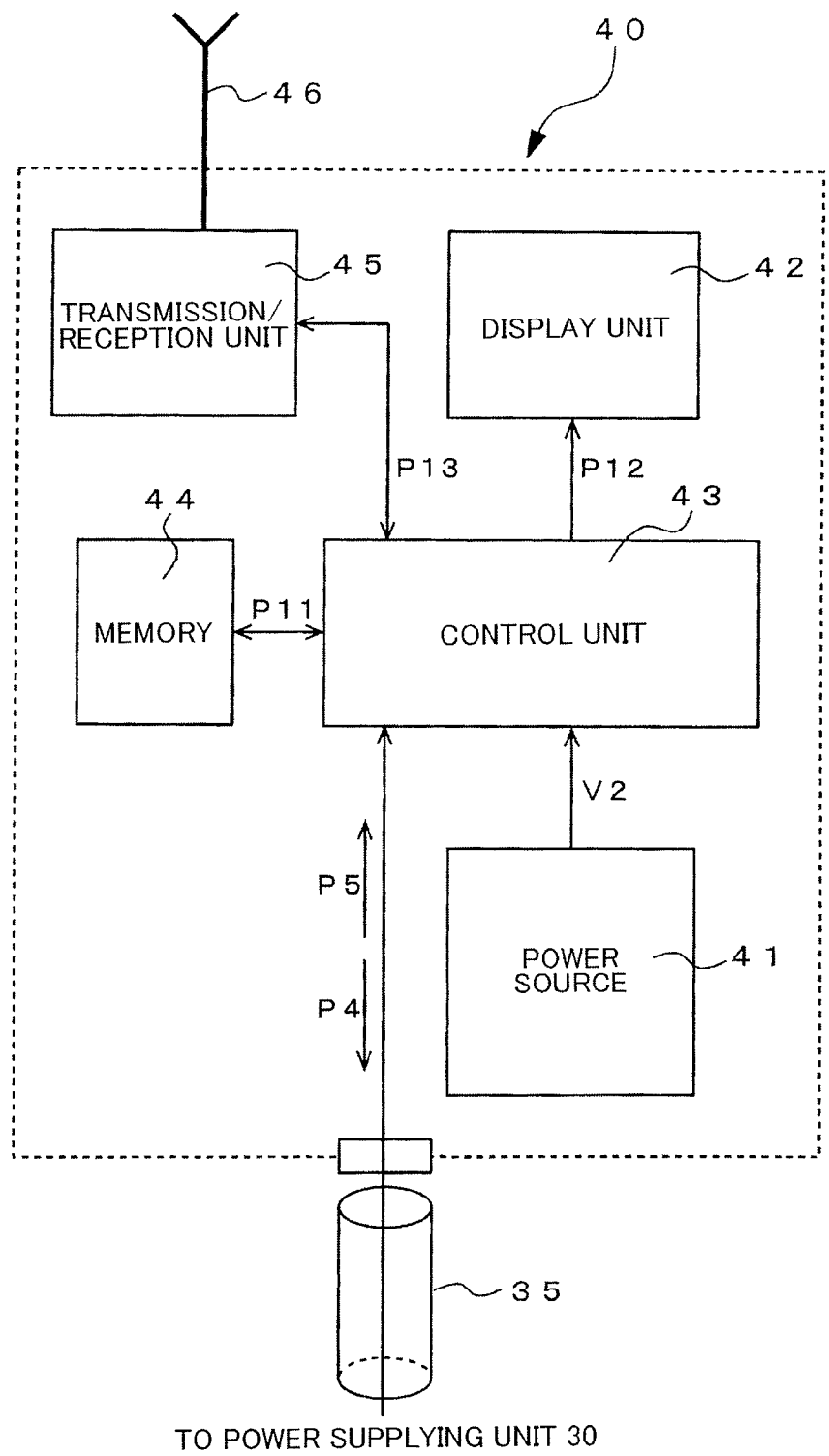
FIG. 8 is a block diagram illustrating an internal configuration of a main body unit of the second embodiment of the present invention.

[Description of Internal Configuration of Main Body Unit According to Second Embodiment: FIG. 8]

Next, referring to FIG. 8, description is made of an example of an internal configuration of the main body unit 40 according to the second embodiment. Note that, for the temperature measuring unit 10 and the power supplying unit 30, the description is made referring to FIG. 3. In FIG. 8, the main body unit 40 includes the power source 41, a control unit 43, a memory 44, the display unit 42, a transmission/reception unit 45, the antenna 46, and the like. It is preferred that the power source 41 be a secondary battery, but the power source 41 may be a general dry cell. A predetermined power supply voltage V2 is output from the power source 41 and input to the control unit 43 to drive the control unit 43. Further, although not shown, the power supply voltage V2 is also supplied to the display unit 42 and the transmission/reception unit 45.

The control unit 43 has a function of controlling the entirety of the main body unit 40, outputs the power signal P4 to the above-mentioned power supplying unit 30 via the cable 35, and receives the receiving signal P5 as an input from the power supplying unit 30 via the cable 35. Further, the memory 44 is a nonvolatile memory such as a flash memory, and stores the temperature information (body temperature) measured by the temperature measuring unit 10 as digital data every measurement time.

Further, the display unit 42 has a function of displaying the temperature information measured by the temperature measuring unit 10 in the form of digital display or graph display. Further, the transmission/reception unit 45 has a function of transmitting the temperature information measured by the temperature measuring unit 10 to the external device (not shown) through the antenna 46 in a wireless manner. Further, the transmission/reception unit 45 can also have a function of receiving a control signal from the external device.

Note that, the memory 44, the display unit 42, and the transmission/reception unit 45 may not necessarily be provided, and may have the configuration changed in conformity with the specifications of the temperature measuring device. For example, if there is no need to communicate with the external device, the transmission/reception unit 45 is unnecessary. Further, if the measured temperature information is continuously transmitted to the external device to allow the temperature information to be confirmed on the external device, the display unit 42 of the main body unit 40 may be omitted.

[Description of Operation of Main Body Unit According to Second Embodiment: FIG. 3 and FIG. 8]

Next, referring to FIG. 3 and FIG. 8, description is made of an outline of an overall operation of the temperature measuring device by focusing on an operation of the main body unit 40. When the control unit 43 of the main body unit 40 is supplied with the power supply voltage V2 from the power source 41 and the high-frequency power signal P4 is output to the power supplying unit 30 via the cable 35, as described above, the high-frequency receiving signal P5 including the temperature information measured by the temperature measuring unit 10 is output from the power supplying unit 30 and input to the control unit 43 of the main body unit 40 via the cable 35.

Subsequently, the control unit 43 extracts the temperature information from the received receiving signal P5, acquires the temperature information every predetermined sampling time, performs arithmetic operation processing such as averaging as necessary, and then stores the resultant in the memory 44 via a data bus P11. Further, the control unit 43 outputs the acquired temperature information to the display unit 42 as a display signal P12, and causes the display unit 42 to display the temperature information (body temperature).

The display unit 42 can have not only a function of displaying the acquired temperature information in real time but also a function of displaying the highest body temperature, the lowest body temperature, an average body temperature, and the like within a predetermined period of time, a function of displaying a change in body temperature in a graph, or other such functions.

Further, the control unit 43 outputs the acquired temperature information to the transmission/reception unit 45 as a communication signal P13, the transmission/reception unit 45 uses the antenna 46 to perform transmission/reception with the external device and sequentially transmit the acquired temperature information. Note that, the control unit 43 receives the control signal from the external device through the transmission/reception unit 45, and can have a function of, based on the control signal from the external portion, starting or ending the measurement, collectively transmitting data within the memory 44, or the like.

Here, by providing the external device (not shown) that receives the temperature information from the main body unit 40 with a bulk memory or a monitor for performing graph display, it is possible to record the body temperature of the subject for a long period of time and possible to confirm a change in body temperature and the like in real time. Accordingly, it is possible to use the temperature measuring device according to this embodiment to perform the continuous measurement twenty-four hours a day and possible to use the external device that is placed in a position apart from the subject to continuously observe the subject's (patient's) condition and immediately handle an abrupt change in the condition or the like.

Third Embodiment

Figure 9:
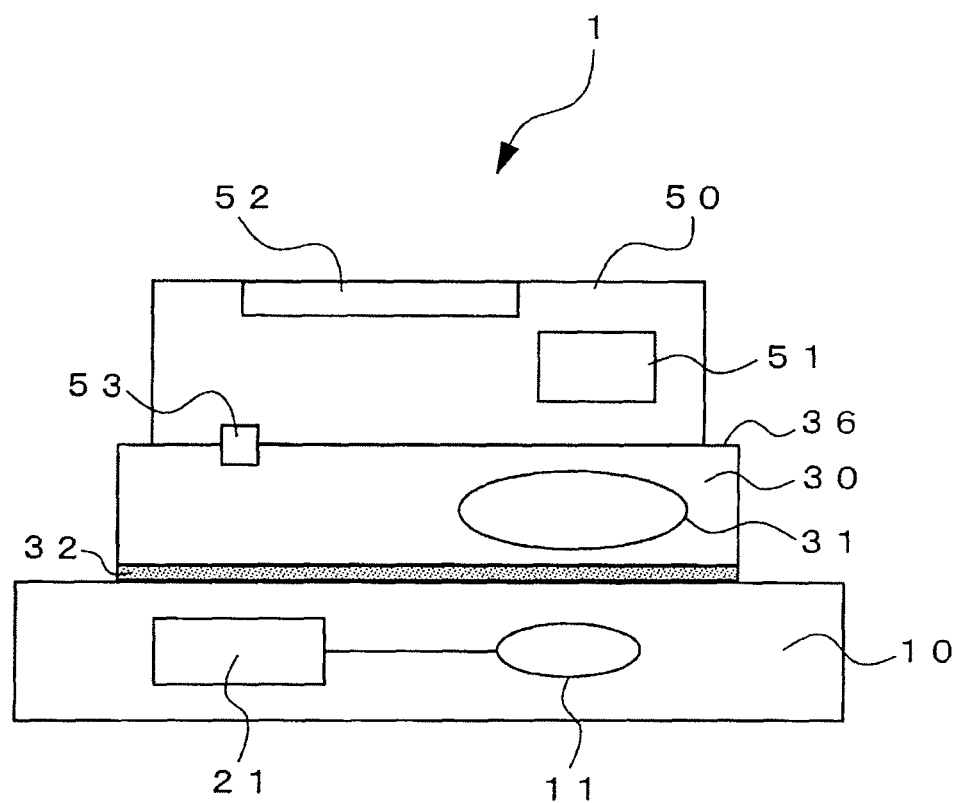
FIG. 9 is a schematic side view illustrating a structure of a temperature measuring device according to a third embodiment of the present invention.
Figure 10:
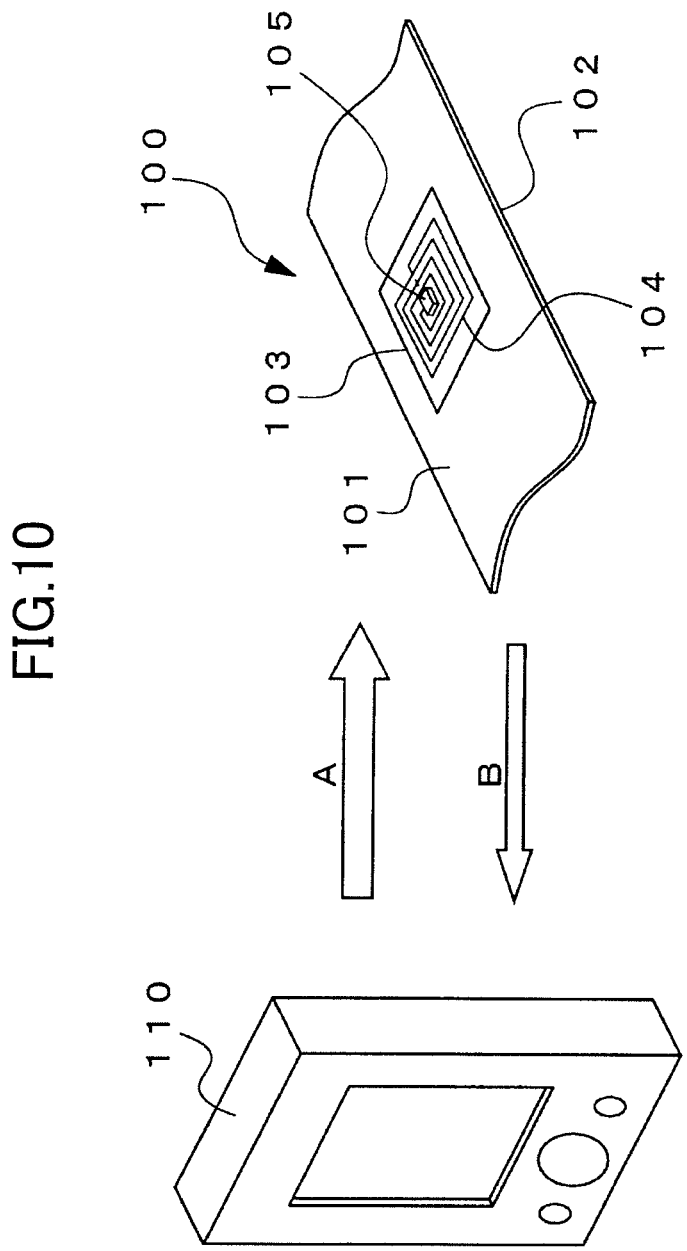
FIG. 10 is a perspective view illustrating a conventional body temperature measuring system.

[Description of Structure of Temperature Measuring Device According to Third Embodiment: FIG. 9]

Next, referring to FIG. 9, description is made of a structure of the temperature measuring device according to the third embodiment. In FIG. 9, a main body unit 50 of the temperature measuring device 1 according to the third embodiment has a power source 51 and a small-size display unit 52 built thereinto, and is the same as the above-mentioned main body unit 40 according to the second embodiment except that the main body unit 50 according to the third embodiment is fixed to a top surface 36 of the power supplying unit 30 so that the power supplying unit 30 is integrally formed with the main body unit 50.

Therefore, in the third embodiment, the entirety of the temperature measuring device 1 is attached to the subject, and hence it is preferred that the main body unit 50 be thin and lightweight in addition to the temperature measuring unit 10 and the power supplying unit 30 being thin and lightweight. Accordingly, it is preferred that the power source 51 of the main body unit 50 be a small-size button battery and that the display unit 52 be a thin and small-size liquid crystal panel or the like. Note that, in a case where the displaying is unnecessary, a small-size transmission/reception unit (not shown) may be incorporated in place of the display unit 52, and the temperature information may be transmitted to the external device in a wireless manner.

Note that, a connection terminal 53 allows the main body unit 50 and the power supplying unit 30 to transmit the power from the main body unit 50 to the power supplying unit 30 and transmit the temperature information from the power supplying unit 30 to the main body unit 50.

Thus, the third embodiment is advantageous in ease of handling because the main body unit 50 and the power supplying unit 30 are integrally formed in a cable-less manner. Note that, the temperature measuring unit 10 and the power supplying unit 30 has a detachably attachable structure in the same manner as in the second embodiment, and hence it suffices that the temperature measuring unit 10 is continuously attached to the subject and only when the body temperature is measured, the power supplying unit 30 integrally formed with the main body unit 50 is brought into close contact with the temperature measuring unit 10, which can produce the same effect as the second embodiment in the third embodiment.

Further, in the third embodiment, the temperature measuring unit 10 and the power supplying unit 30 may be integrally fixed to each other as in the above-mentioned modified examples of the first embodiment (see FIG. 4A and FIG. 4B). Accordingly, all of the temperature measuring unit 10, the power supplying unit 30, and the main body unit 50 are integrated with one another, and therefore become easy to handle in spite of the fact that the device attached to the subject has a somewhat larger size.

Fourth Embodiment

Figure 11:
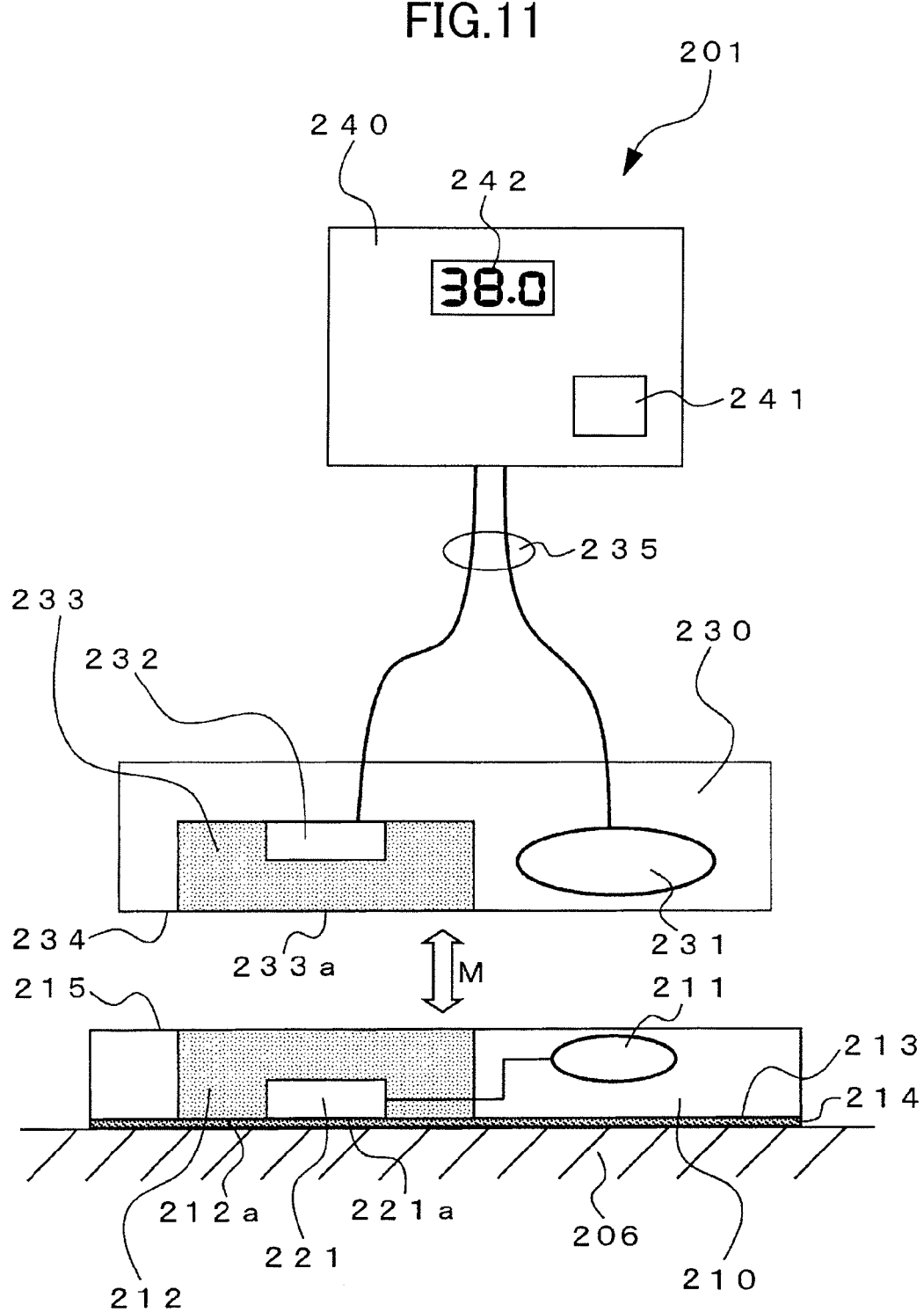
FIG. 11 is a schematic side view illustrating an overall structure of a temperature measuring device according to a fourth embodiment of the present invention.

[Description of Structure of Temperature Measuring Device According to Fourth Embodiment: FIG. 11]

Referring to FIG. 11, description is made of a structure of the temperature measuring device according to the fourth embodiment. FIG. 11 illustrates a temperature measuring device 201 according to the fourth embodiment. The temperature measuring device 201 includes a temperature measuring unit 210, a power supplying unit 230, and a main body unit 240. The temperature measuring unit 210 has a function of measuring a body temperature by being brought into direct contact with a surface of a skin 206 of the subject as an object to be measured whose body temperature is to be measured, and includes a first coil 211 to which power is supplied by an induced electromotive force, a first temperature sensing element 221 for measuring the body temperature of the subject, and a first thermal resistor 212 having a predetermined thermal conductivity which covers the first temperature sensing element 221. In other words, the first temperature sensing element 221 in this embodiment and in the fifth to eleventh embodiments that are described later is a temperature measuring unit-side temperature sensing element that is located on the side of temperature measuring unit 210.

Here, the first thermal resistor 212 is exposed on both the side of an under surface 213 of the temperature measuring unit 210 and the side of a top surface 215 thereof. Further, the first thermal resistor 212 covers most part of the first temperature sensing element 221, but an under surface 221a of the first temperature sensing element 221 is exposed from an under surface 212a of the first thermal resistor 212. Accordingly, the under surface 221a of the first temperature sensing element 221 is installed in a state of being exposed or nearly exposed from the under surface 213 of the temperature measuring unit 210.

With this structure, the first temperature sensing element 221 is thermally coupled directly to the skin 206 of the subject that is brought into close contact with the under surface 213 of the temperature measuring unit 210, and hence it is possible to measure the surface temperature (body temperature) of the skin 206 with high precision. Further, a thin sheet-like adhesive 214, which is used for adhering and attaching the temperature measuring unit 210 to the skin 206 of the subject, is installed on the under surface 213 of the temperature measuring unit 210, and the temperature measuring unit 210 can be adhered to the skin 206 of the subject with the adhesive 214. The adhesive 214 is thin and low in thermal resistance, which does not hinder the body temperature measurement. Note that, the first temperature sensing element 221 is actually built into a control IC described later.

Further, the power supplying unit 230 includes a second coil 231 for supplying power to the temperature measuring unit 210 by the induced electromotive force, a second temperature sensing element 232 for measuring the body temperature of the subject, and a second thermal resistor 233 having a predetermined thermal conductivity which covers the second temperature sensing element 232. Here, an under surface 233a of the second thermal resistor 233 is exposed from an under surface 234 of the power supplying unit 230. In other words, the second temperature sensing element 232 according to this embodiment and the fifth to eleventh embodiments is a power supplying unit-side temperature sensing element located on the side of the power supplying unit 230.

The power supplying unit 230 is connected to the main body unit 240 via a cable 235. The main body unit 240 includes a power source 241 for supplying power to the power supplying unit 230 via the cable 235 and a display unit 242 for displaying the measured temperature information. Note that, a cable connection between the power supplying unit 230 and the main body unit 240 is described later in detail, and internal configurations and operations of the temperature measuring unit 210, the power supplying unit 230, and the main body unit 240 are also described later. Further, without using the cable 235, the main body unit 240 may be connected to the power supplying unit 230 in close contact therewith.

Further, by predetermined means (not shown), as indicated by the arrow M, the temperature measuring unit 210 and the power supplying unit 230 are detachably attachable to each other. Here, in order to obtain the detachably attachable manner of the temperature measuring unit 210 and the power supplying unit 230, as an example, a adhesive (not shown) having a weak adhesion force is adhered on an entirety or part of the top surface 215 of the temperature measuring unit 210, or adhesive surface processing is processed on the top surface 215 of the temperature measuring unit 210. Therefore, it is possible to integrate the temperature measuring unit 210 and the power supplying unit 230 with each other with a predetermined adhesion force by bringing the top surface 215 of the temperature measuring unit 210 and the under surface 234 of the power supplying unit 230 into close contact with each other.

Further, if the power supplying unit 230 is pulled apart from the temperature measuring unit 210 with a predetermined force in a state in which the temperature measuring unit 210 and the power supplying unit 230 are integrated in close contact with each other, it is possible to separate the power supplying unit 230 from the temperature measuring unit 210 because the adhesion force of the adhesive or the adhesive surface processing that are described above is weak. As a result, the temperature measuring unit 210 and the power supplying unit 230 are detachably attachable to each other.

Figure 12:
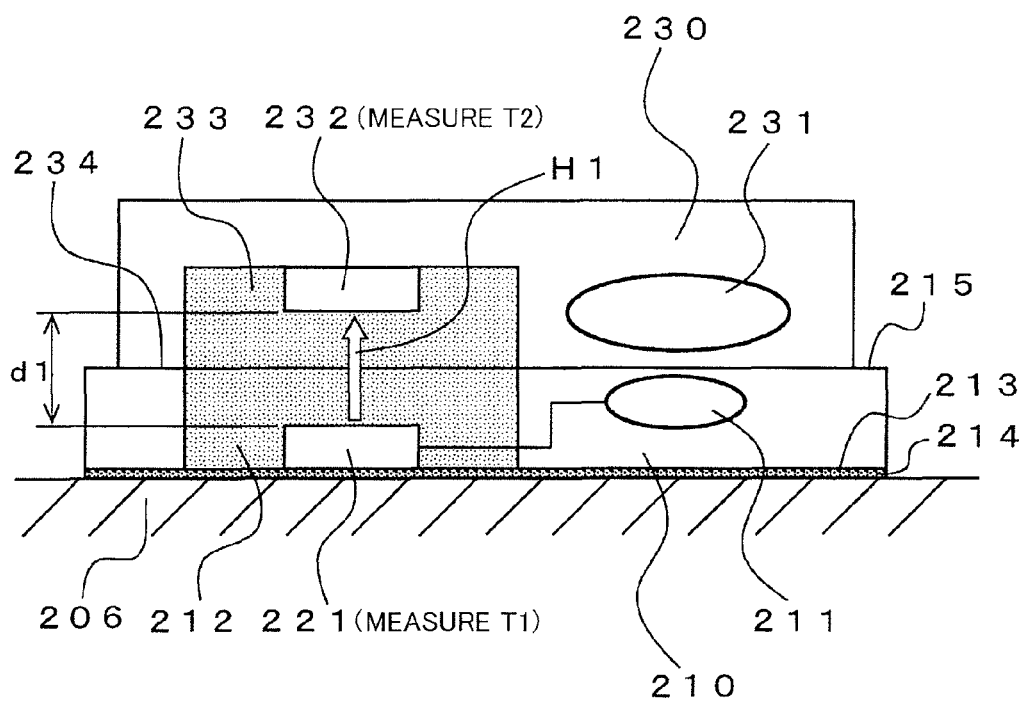
FIG. 12 is a schematic side view illustrating a close contact state between a temperature measuring unit and a power supplying unit of the temperature measuring device according to the fourth embodiment of the present invention.

[Description of Close Contact State Between Temperature Measuring Unit and Power Supplying Unit According to Fourth Embodiment: FIG. 12]

Next, referring to FIG. 12, description is made of a close contact state between the temperature measuring unit and the power supplying unit according to the fourth embodiment. Note that, in FIG. 12, description of the main body unit 240 and the cable 235 is omitted. In FIG. 12, in the temperature measuring unit 210 and the power supplying unit 230, the top surface 215 of the temperature measuring unit 210 and the under surface 234 of the power supplying unit 230 are brought into close contact with each other with the above-mentioned adhesive (not shown) or by the adhesive surface processing, and the temperature measuring unit 210 and the power supplying unit 230 are integrally stacked one on the other in a close contact state.

Here, when the temperature measuring unit 210 and the power supplying unit 230 are integrally stacked one on the other, as described above, the first thermal resistor 212 is exposed from the top surface 215 of the temperature measuring unit 210, while the second thermal resistor 233 is exposed from the under surface 234 of the power supplying unit 230, thereby bringing the first thermal resistor 212 on the side of the temperature measuring unit 210 and the second thermal resistor 233 on the side of the power supplying unit 230 into close contact with each other to integrate the thermal resistors with each other. Therefore, between the first temperature sensing element 221 and the second temperature sensing element 232, a heat flow path H1 is formed by the first thermal resistor 212 and the second thermal resistor 233, and the first temperature sensing element 221 and the second temperature sensing element 232 are arranged so as to be opposed to each other via the heat flow path H1, with the result that the first temperature sensing element 221 and the second temperature sensing element 232 are thermally coupled to each other by the heat flow path H1.

In other words, the heat flow path H1 between the first temperature sensing element 221 and the second temperature sensing element 232 is formed by integrating the temperature measuring unit 210 and the power supplying unit 230 that are detachably attachable to each other in close contact with each other, which is an important feature of this embodiment.

With this structure, in the case where the temperature measuring unit 210 is attached to the skin 206 of the subject, the first temperature sensing element 221 of the temperature measuring unit 210 measures the surface temperature by being thermally coupled directly to the surface of the skin 206. The temperature measured by the first temperature sensing element 221 is defined as a temperature T1. Further, the second temperature sensing element 232 of the power supplying unit 230 measures a temperature obtained after the surface temperature of the skin 206 is transmitted through the heat flow path H1. The temperature measured by the second temperature sensing element 232 is defined as a temperature T2. In other words, the temperature obtained by directly measuring the body temperature of the skin 206 of the subject without the intermediation of the heat flow path H1 is the temperature T1, while the temperature obtained by measuring the body temperature of the skin 206 of the subject through the heat flow path H1 having a predetermined thermal resistance is the temperature T2.

Then, the thermal resistance of the heat flow path H1 is calculated from the respective thermal conductivities of the first thermal resistor 212 and the second thermal resistor 233 that form the heat flow path H1 and a distance d1 between the first temperature sensing element 221 and the second temperature sensing element 232, and a known heat conduction equation (for example, equation disclosed in JP 61-120026 A) is solved based on two measured temperatures T1 and T2, thereby allowing estimation of a deep body temperature of the skin 206. Note that, the thermal conductivities of the first thermal resistor 212 and the second thermal resistor 233 may be the same or different from each other.

Further, the temperature measuring unit 210 and the power supplying unit 230 are integrated with each other in a close contact state, and hence the first coil 211 built into the temperature measuring unit 210 and the second coil 231 built into the power supplying unit 230 have such a positional relationship as to be placed in close proximity to each other. According to this structure, the power supply efficiency due to the induced electromotive force caused by the electromagnetic wave from the second coil 231 of the power supplying unit 230 to the first coil 211 of the temperature measuring unit 210 becomes high, and hence it is possible to achieve power saving of the temperature measuring device.

Further, in the same manner, information on the temperature T1 measured by the first temperature sensing element 221 is transmitted from the first coil 211 of the temperature measuring unit 210 to the second coil 231 of the power supplying unit 230 by the electromagnetic wave, and a transmission efficiency thereof is also satisfactorily excellent because the first coil 211 and the second coil 231 are located in proximity to each other. Therefore, information can be transmitted from the temperature measuring unit 210 to the power supplying unit 230 with small power, which allows simplified information transmission that does not require distinction from another temperature measuring device.

Further, because, as described above, the temperature measuring unit 210 and the power supplying unit 230 are brought into close contact with each other, a positional relationship between the temperature measuring unit 210 and the power supplying unit 230 exhibits no displacement, and a positional relationship between the built-in first coil 211 and the built-in second coil 231 also exhibits no displacement. Accordingly, without fluctuation in the transmission/reception level of the first coil 211 and the second coil 231 due to the electromagnetic wave, it is possible to achieve extremely stable power supply and information transmission.

Figure 13:
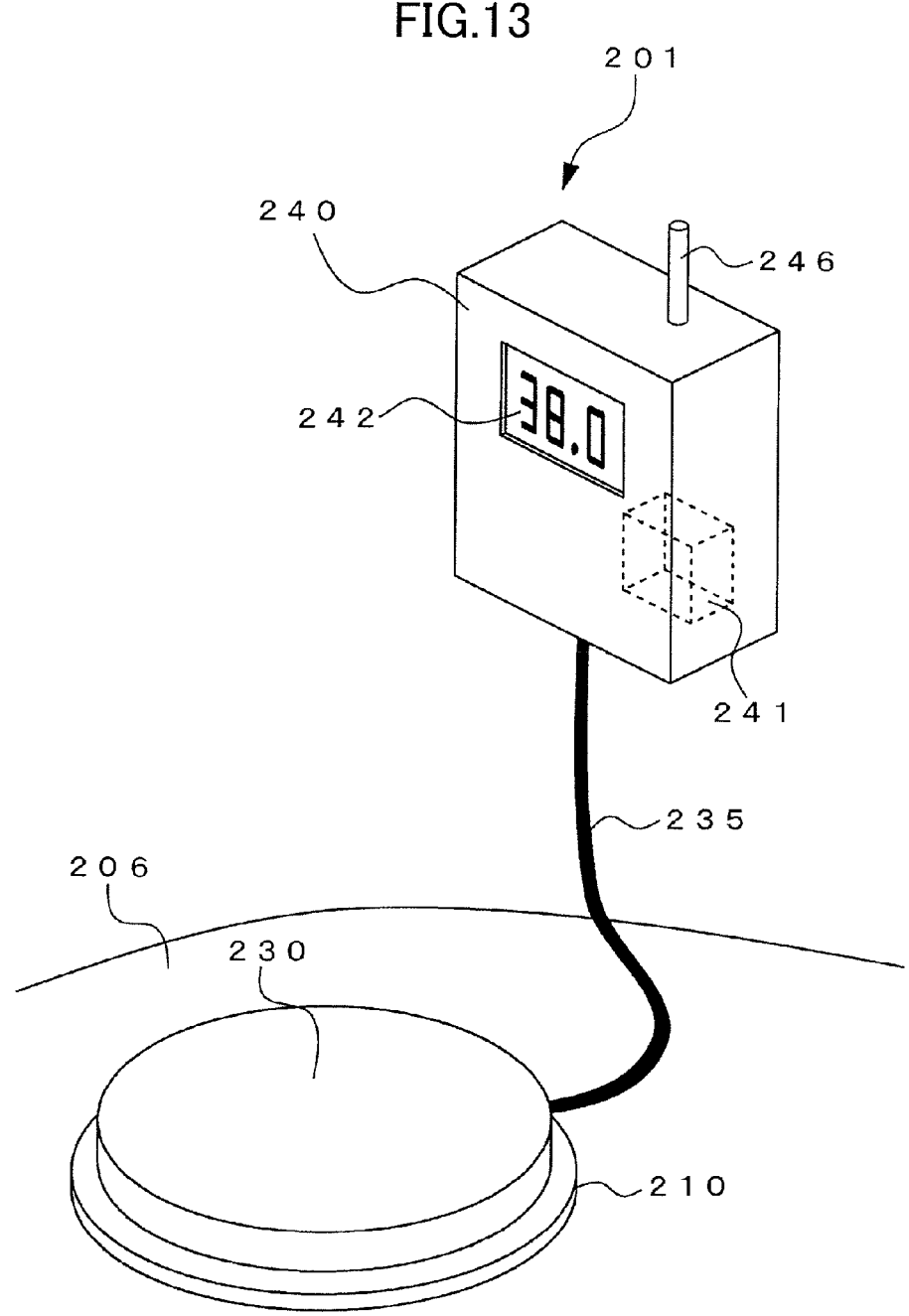
FIG. 13 is a perspective view illustrating a body temperature measurement example of the temperature measuring device according to the fourth embodiment of the present invention.

[Description of Body Temperature Measurement Example of Temperature Measuring Device According to Fourth Embodiment: FIG. 13]

Next, referring to the perspective view of FIG. 13, description is made of a body temperature measurement example according to the fourth embodiment. FIG. 13 illustrates a state in which the body temperature of the subject is being measured by using the temperature measuring unit 210 and the power supplying unit 230 of the temperature measuring device 201 that are integrally stacked one on the other as illustrated in FIG. 12 described above.

In FIG. 13, the temperature measuring unit 210 and the power supplying unit 230 are integrated with each other in a close contact state, and the temperature measuring unit 210 is attached to the skin 206 of the subject. Further, one end portion of the cable 235 is connected to a side surface of the power supplying unit 230, and the other end portion of the cable 235 is connected to the main body unit 240. The main body unit 240 includes the power source 241 (indicated by the broken lines) and the display unit 242 for displaying the measured body temperature. Note that, an antenna 246 for transmitting/receiving a signal to/from the external device (not shown) in a wireless manner is described later.

Here, when power is supplied from the main body unit 240 to the power supplying unit 230 via the cable 235, the power is supplied from the second coil 231 of the power supplying unit 230 (see FIG. 12) to the first coil 211 of the temperature measuring unit 210 (see FIG. 12) by the electromagnetic wave. Further, when the temperature measuring unit 210 is supplied with the power, the first temperature sensing element 221 (see FIG. 12) measures the body temperature of the subject and transmits the temperature information from the first coil 211 to the second coil 231 of the power supplying unit 230, and the temperature information transmitted to the power supplying unit 230 is transmitted to the main body unit 240 via the cable 235.

Meanwhile, the temperature information measured by the second temperature sensing element 232 of the power supplying unit 230 (see FIGS. 2A and 2B) is directly transmitted to the main body unit 240 via the cable 235. Then, arithmetic operation processing is performed within the main body unit 240 based on the two pieces of temperature information, and the body temperature obtained by the arithmetic operation is displayed on the display unit 242.

In this manner, the temperature measuring unit 210 and the power supplying unit 230 that are attached to the subject are thin as described in the figure, and therefore can be continuously attached to the subject without bringing discomfort. Further, the cable 235 allows the main body unit 240 to be placed in a position apart from the temperature measuring unit 210 and the power supplying unit 230, thereby allowing the measurer (not shown) to read the result of the measurement at a predetermined distance apart from the subject. Note that, the cable 235 has an arbitrary length and can be set by the measurer to an optimum length that facilitates the operation of the main body unit 240.

Further, because, as described above, the temperature measuring unit 210 and the power supplying unit 230 are detachably attachable to each other, it is possible to prevent a load from being placed on the subject by separating the power supplying unit 230 from the temperature measuring unit 210 and attaching only the temperature measuring unit 210 to the subject when the body temperature measurement is not performed, and it is also possible to quickly restart the body temperature measurement by immediately integrating the power supplying unit 230 in close contact therewith at the time of remeasurement.

Further, the temperature measuring unit 210 does not need an electrode or the like used for an electrical connection because the power supply and the information transmission are performed with respect to the power supplying unit 230 in a contactless manner, and can be manufactured at low cost with a simple structure. Therefore, the temperature measuring unit 210 that is brought into direct contact with the skin of the subject can be disposed of after one use. Accordingly, it is possible to provide a temperature measuring device that is excellent in sanitation management such as infection prevention and high in usability.

Further, the power supplying unit 230 and the main body unit 240 that are separated from the temperature measuring unit 210 can be used for a subject to which another temperature measuring unit 210 is attached, and hence it is possible to improve the utilization rate of the device by reducing the unused state of the power supplying unit 230 and the main body unit 240 of the temperature measuring device 201.

In this manner, in the temperature measuring device according to this embodiment, the power supplying unit 230 and the main body unit 240 are connected to each other through the cable 235, and the temperature measuring unit 210 and the power supplying unit 230 are detachably attachable to each other. Therefore, the temperature measuring device according to this embodiment has two modes: a mode illustrated in FIG. 11 in which the temperature measuring unit 210 and the power supplying unit 230 are separated from each other; and a mode illustrated in FIG. 12 and FIG. 13 in which the temperature measuring unit 210 and the power supplying unit 230 are integrated in close contact with each other.

In other words, the temperature measuring unit 210 can be continuously attached to the skin 206 of the subject. In the case of measuring the body temperature of the subject, as illustrated in FIG. 12 and FIG. 13, the temperature measuring unit 210 and the power supplying unit 230 are integrated with each other to measure the body temperature. Further, in the case where the subject moves, the case where the body temperature does not need to be measured, and other such cases, as illustrated in FIG. 11, the temperature measuring unit 210 and the power supplying unit 230 can be separated from each other to cause only the thin temperature measuring unit 210 to be attached to the subject.

By thus providing the temperature measuring device with the two modes according to the presence/absence of the measurement of the body temperature, the temperature measuring unit 210 does not need to be attached to the subject repeatedly each time the measurement is started, and it is possible to provide the temperature measuring device that is high in usability for the subject and the measurer. Further, by the fact that the temperature measuring unit 210 and the power supplying unit 230 are detachably attachable to each other and that the temperature measuring unit 210 can be continuously attached to the subject, it is possible to maintain the attached position and the attached state of the temperature measuring unit 210 in a fixed level, and hence it is possible to achieve the body temperature measurement excellent in reproducibility in which the cause of unevenness in measurement is eliminated.

Figure 14:
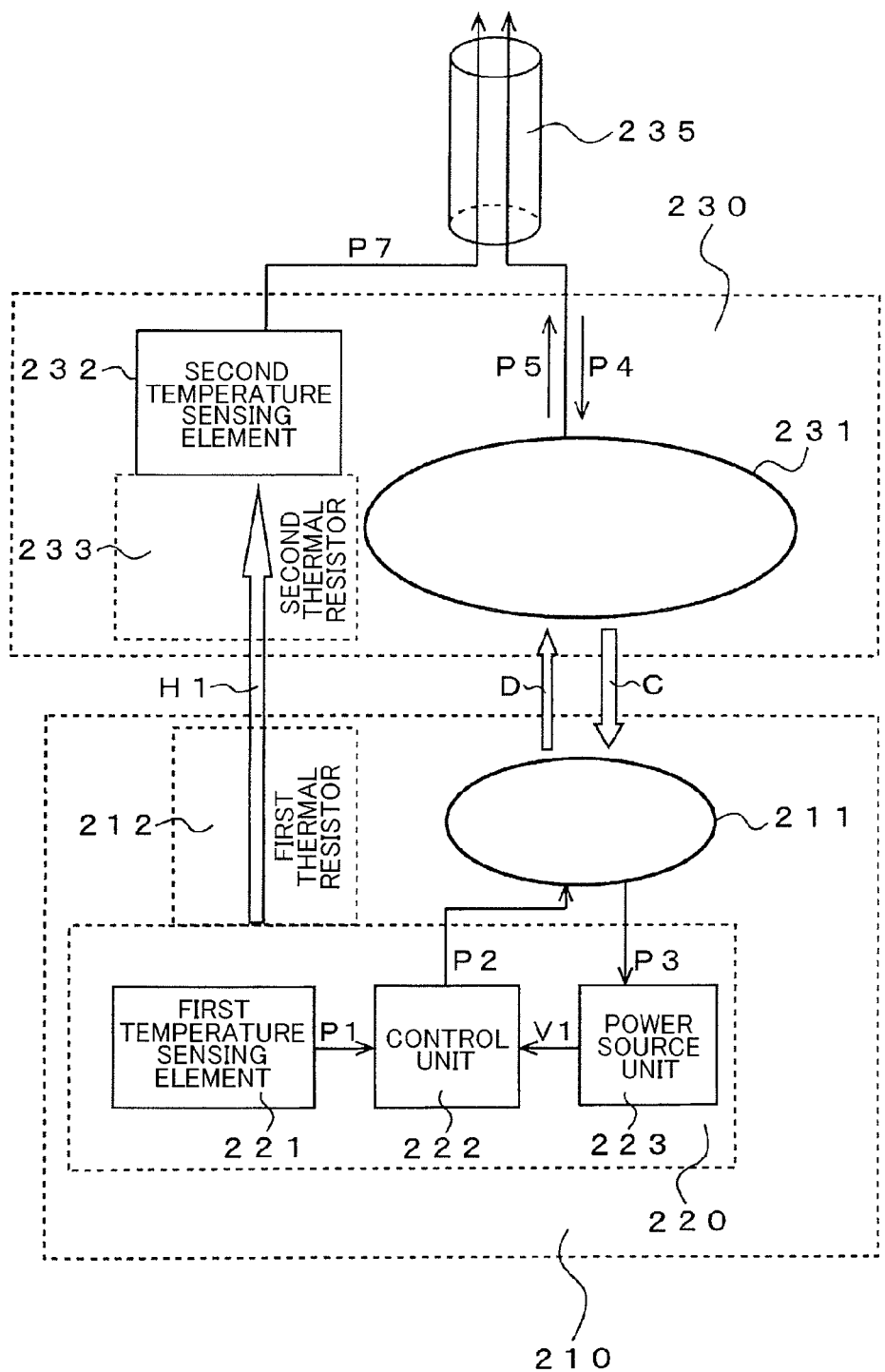
FIG. 14 is a block diagram illustrating internal configurations of the temperature measuring unit and the power supplying unit according to the fourth embodiment of the present invention.

[Description of Internal Configurations of Temperature Measuring Unit and Power Supplying Unit According to Fourth Embodiment: FIG. 14]

Next, referring to the block diagram of FIG. 14, description is made of internal configurations of the temperature measuring unit and the power supplying unit according to the fourth embodiment. In FIG. 14, the temperature measuring unit 210 of the temperature measuring device 201 is structured of a control IC 220, the above-mentioned first coil 211, and the above-mentioned first thermal resistor 212. The control IC 220 is a semiconductor integrated circuit into which the above-mentioned first temperature sensing element 221, a control unit 222, and a power source unit 223 are built.

The first temperature sensing element 221 built into the control IC 220 is a semiconductor body temperature sensor, and the temperature signal P1, which is the information on the temperature T1 obtained by directly measuring the body temperature of the skin 206 of the subject (see FIG. 12), is output from the first temperature sensing element 221. Note that, instead of being built into the control IC 220, the first temperature sensing element 221 may be provided as a thermistor or the like that is installed outside the control IC 220.

Further, the control unit 222 of the control IC 220 receives the temperature signal P1 as an input from the first temperature sensing element 221, and outputs the high-frequency transmitting signal P2 modulated with the temperature information. The power source unit 223 of the control IC 220 receives the high-frequency electromotive force P3 as an input from the first coil 211 and performs internal rectification thereof to output the power supply voltage V1 and supply power to the control unit 222 and the like.

The first coil 211 generates the induced electromotive force caused by the electromagnetic wave (arrow C) from the second coil 231 of the power supplying unit 230, and supplies the electromotive force P3 to the power source unit 223. Further, the first coil 211 receives the transmitting signal P2 as an input from the control unit 222 and radiates the electromagnetic wave (arrow D). Further, the first thermal resistor 212 is installed so as to cover the first temperature sensing element 221 as described above, and forms the heat flow path H1. Thus, the temperature measuring unit 210 is internally structured of only the first coil 211, the control IC 220, and the first thermal resistor 212, which can achieve a simple structure that is thin and lightweight.

The power supplying unit 230 is structured of the second coil 231, the second temperature sensing element 232, and the second thermal resistor 233, and is connected to the cable 235. Here, the second coil 231 receives the high-frequency power signal P4 supplied from the cable 235 as an input, and radiates the electromagnetic wave (arrow C) to supply power to the temperature measuring unit 210. Further, the second coil 231 receives the electromagnetic wave (arrow D) generated by the first coil 211 of the temperature measuring unit 210, and outputs the receiving signal P5 to the cable 235.

Further, the second temperature sensing element 232 outputs a temperature signal P7, which is information on the temperature T2 obtained by measuring the body temperature of the skin 206 of the subject (see FIG. 12) whose heat has been transmitted from the heat flow path H1, to the cable 235. Further, the second thermal resistor 233 is installed so as to cover the second temperature sensing element 232 as described above, and forms the heat flow path H1 together with the first thermal resistor 212. Note that, as described above, the cable 235 is connected to the main body unit 240 of the temperature measuring device 201, and the internal configuration of the main body unit 240 is described later. Thus, the power supplying unit 230 is internally structured of only the second coil 231, the second temperature sensing element 232, and the second thermal resistor 233, which can obtain a simple structure that is thin and lightweight.

As described above, because an electrical connecting member does not exist between the temperature measuring unit 210 and the power supplying unit 230, it is possible to supply power from the power supplying unit 230 to the temperature measuring unit 210 in a wireless manner, and it is also possible to transmit the temperature information from the temperature measuring unit 210 to the power supplying unit 230 in a wireless manner.

Note that, in this embodiment, as the first coil 211, one coil serves both to receive the electromagnetic wave (C) for supplying power and to radiate the electromagnetic wave (arrow D) for the transmitting signal P2, but the present invention is not limited to this structure, and may be formed of two separate coils for the reception and the radiation. Further, in the same manner, the second coil 231 may be formed of two coils for the reception and the radiation. Therefore, the receiving coil and the radiating coil can each be formed to have an optimum shape in an optimum position, and therefore can improve their respective transmission efficiencies.

Figure 15:
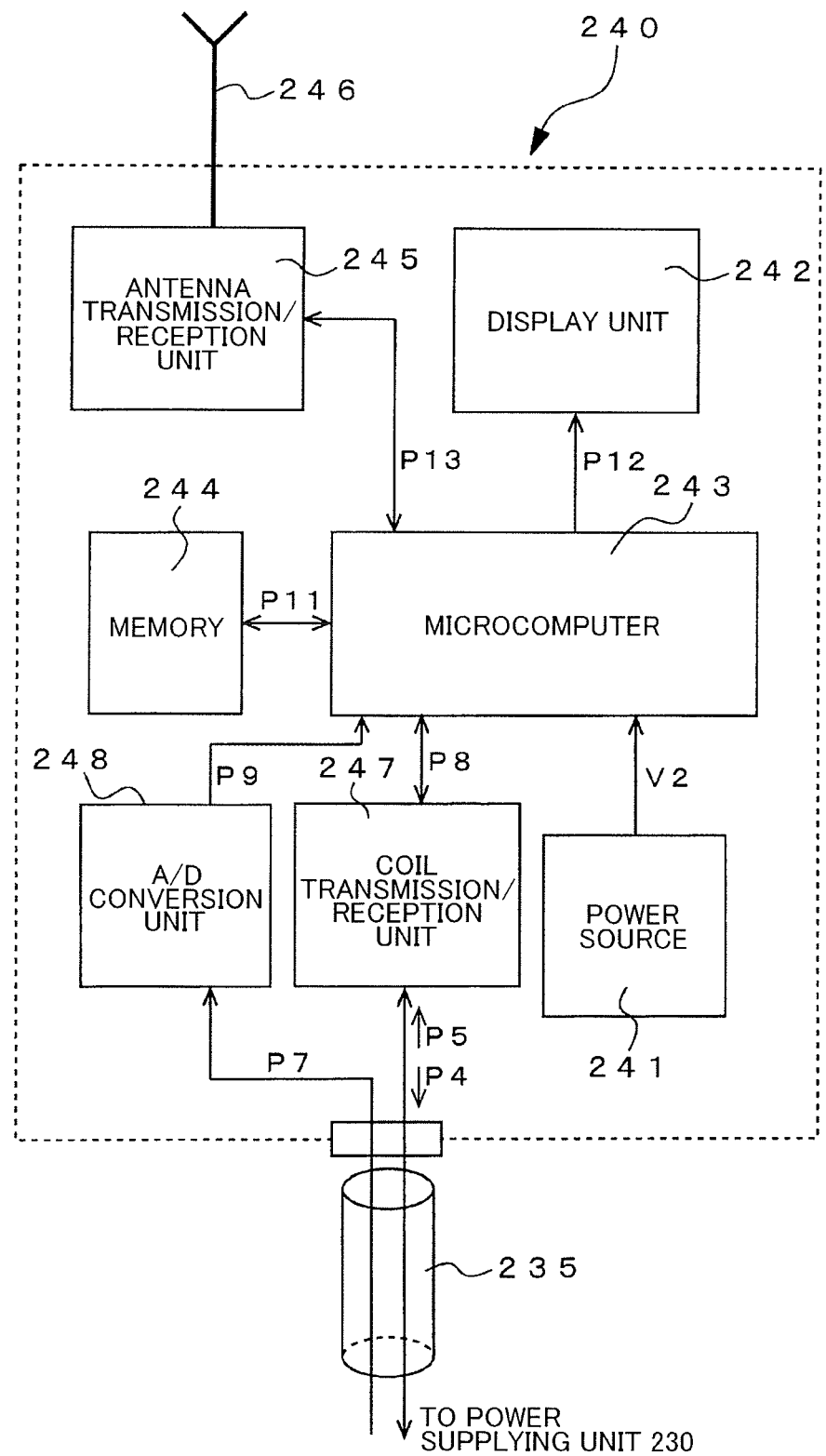
FIG. 15 is a block diagram illustrating an internal configuration of a main body unit of the fourth embodiment of the present invention.

[Description of Internal Configuration of Main Body Unit According to Fourth Embodiment: FIG. 15]

Next, referring to FIG. 15, description is made of an example of an internal configuration of the main body unit 240 according to the first embodiment. Note that, for the configurations of the temperature measuring unit 210 and the power supplying unit 230, the description is made referring to FIG. 14 described above. In FIG. 15, the main body unit 240 includes the power source 241, the display unit 242, a microcomputer 243, a memory 244, an antenna transmission/reception unit 245, the antenna 246, a coil transmission/reception unit 247, and an A/D conversion unit 248. It is preferred that the power source 241 be a secondary battery, but the power source 241 may be a general dry cell. The predetermined power supply voltage V2 is output from the power source 241 and input to the microcomputer 243 to drive the microcomputer 243. Further, although not illustrated, the power supply voltage V2 is also supplied to other circuit blocks.

The microcomputer 243 has a function of controlling the entirety of the main body unit 240 and controls respective circuit blocks by receiving as an input or outputting respective signals such as a coil control signal P8, temperature data P9, the data bus P11, the display signal P12, and the communication signal P13. The coil transmission/reception unit 247 is driven by the coil control signal P8 to output the power signal P4 to the above-mentioned power supplying unit 230 via the cable 235 and receive the receiving signal P5 as an input from the power supplying unit 230.

Further, the A/D conversion unit 248 receives the temperature signal P7 as an input from the cable 235, performs A/D conversion, and outputs the temperature data P9 to the microcomputer 243. Note that, the temperature data P9 is digital data on the temperature T2 measured by the above-mentioned second temperature sensing element 232. Note that, the A/D conversion unit 248 may be built into the microcomputer 243, or an IC including an A/D conversion unit may be built into the power supplying unit 230 along with the second temperature sensing element 232.

Further, the memory 244 is a nonvolatile memory such as a flash memory, and is connected to the data bus P11 to store the measured temperatures T1 and T2, calculated deep body temperature information, and the like as digital data.

Further, the display unit 242 has a function of displaying the calculated deep body temperature information and the like in the form of digital display or graph display. Further, the antenna transmission/reception unit 245 has a function of transmitting the calculated deep body temperature information and the like to the external device (not shown) through the antenna 246 in a wireless manner. Further, the antenna transmission/reception unit 245 can also have a function of receiving the control signal from the external device.

Note that, the memory 244, the display unit 242, and the antenna transmission/reception unit 245 may not necessarily be provided, and may have the configuration changed in conformity with the specifications of the temperature measuring device. For example, if there is no need to communicate with the external device, the antenna transmission/reception unit 245 is unnecessary. Further, if the measured and calculated temperature information is continuously transmitted to the external device to allow the temperature information to be confirmed on the external device, the display unit 242 of the main body unit 240 may be omitted.

Figure 16:
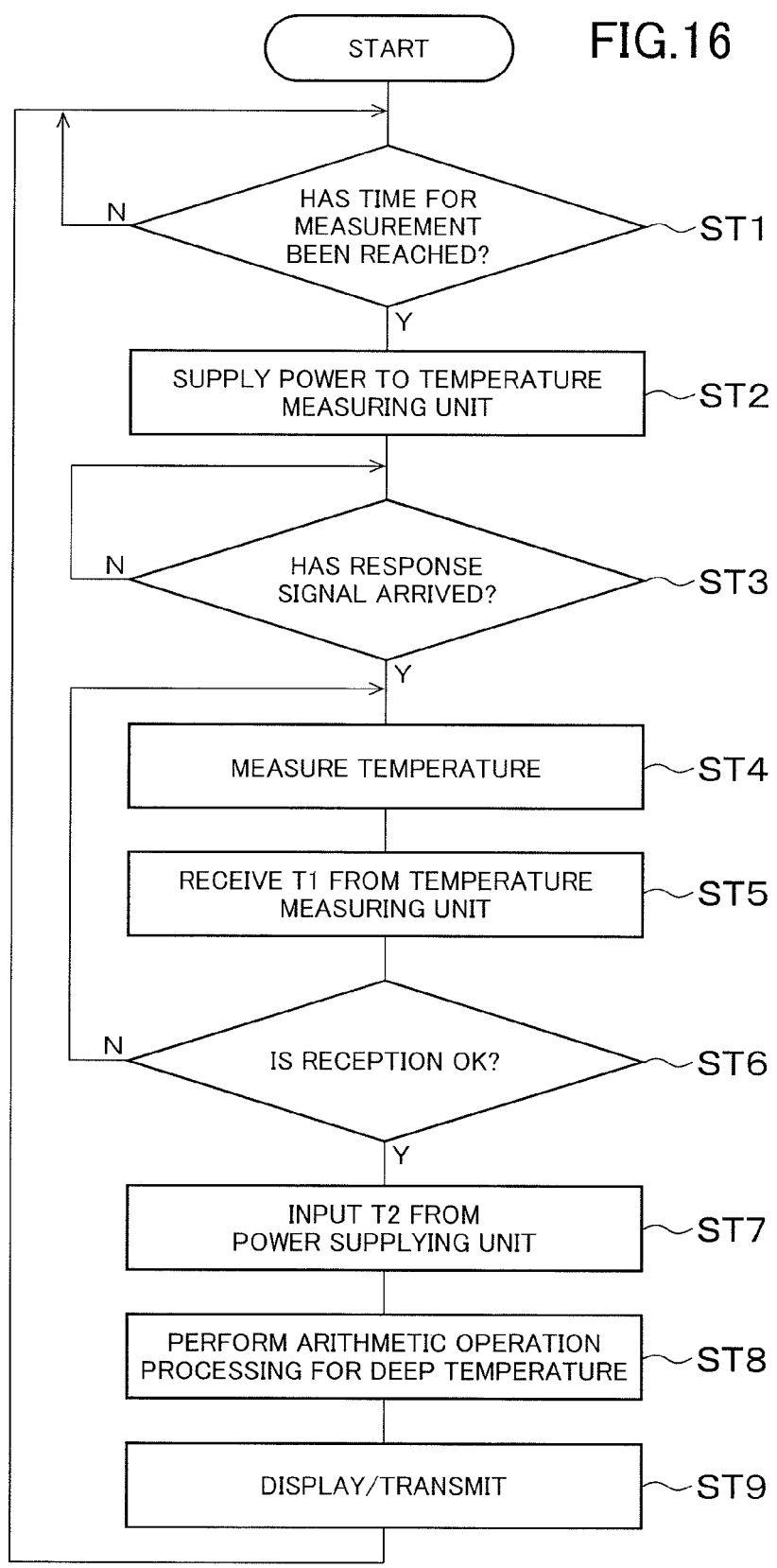
FIG. 16 is a flowchart illustrating an operation according to the fourth embodiment of the present invention.

[Description of Operation of Temperature Measuring Device According to Fourth Embodiment: FIG. 14, FIG. 15, and FIG. 16]

Next, referring to the flowchart of FIG. 16, description is made of an outline of the operation of the temperature measuring device according to the fourth embodiment. Note that, for the internal configuration of the temperature measuring device, the description is made referring to FIGS. 14 and 15 described above. Further, as preconditions for the description of the operation, as illustrated in FIG. 13, it is assumed that the temperature measuring unit 210 is attached to the skin 206 of the subject, the temperature measuring unit 210 and the power supplying unit 230 are integrated with each other in a close contact state, and the microcomputer 243 of the main body unit 240 is in operation while being supplied with power from the power source 241 and is executing the measurement operation at predetermined time intervals.

In FIG. 16, the microcomputer 243 of the main body unit 240 of the temperature measuring device 201 uses a time counter (not shown) provided therein to determine whether or not a start time for the measurement of the body temperature of the subject has been reached (Step ST1). Here, if the measurement time has not been reached, Step ST1 is repeated, and if the measurement time has been reached, the procedure advances to the subsequent Step ST2. Note that, an interval between the measurement times may be arbitrarily determined, and can be set to, for example, every 10 minutes or every hour.

Subsequently, if it is positively determined (to start measurement) in Step ST1, the microcomputer 243 outputs the power signal P4 from the coil transmission/reception unit 247, and when the power signal P4 is supplied to the second coil 231 of the power supplying unit 230, the electromagnetic wave (arrow C) is radiated from the second coil 231. When the electromagnetic wave is transmitted to the first coil 211 of the temperature measuring unit 210, the induced electromotive force is generated, and the high-frequency electromotive force P3 is output from the first coil 211. The power source unit 223 of the control IC 220 receives the electromotive force P3 as an input and performs internal rectification thereof to output the direct-current power supply voltage V1. With the series of operations, power is supplied from the power supplying unit 230 to the temperature measuring unit 210 in a wireless manner (Step ST2).

Subsequently, the control IC 220 of the temperature measuring unit 210 is supplied with the power to start the operation, and transmits a response signal to the first coil 211 with the response signal superposed on the transmitting signal P2. The first coil 211 receives the transmitting signal P2 as an input and radiates the electromagnetic wave (arrow D) to transmit the electromagnetic wave to the second coil 231 of the power supplying unit 230. The microcomputer 243 of the main body unit 240 monitors the receiving signal P5 from the power supplying unit 230 via the coil transmission/reception unit 247, and determines whether or not the response signal has arrived from the temperature measuring unit 210 (Step ST3). Here, if the response signal has been confirmed, the procedure advances to the subsequent Step ST4, and if the response signal does not arrive, the procedure waits until the arrival.

Subsequently, if the microcomputer 243 has confirmed the response signal, the control IC 220 of the temperature measuring unit 210 starts temperature measurement using the first temperature sensing element 221, and the first temperature sensing element 221 directly measures the body temperature of the skin 206 of the subject and outputs the temperature signal P1. Further, the second temperature sensing element 232 of the power supplying unit 230 measures the body temperature of the skin 206 of the subject whose heat has been transmitted through the heat flow path H1 and outputs the temperature signal P7 (Step ST4).

Subsequently, the control IC 220 of the temperature measuring unit 210 receives the temperature signal P1 as an input, converts therein the temperature signal P1 into digital data, and outputs the converted data to the first coil 211 with the converted data superposed on the high-frequency transmitting signal P2, and the first coil 211 receives the transmitting signal P2 as an input and radiates the electromagnetic wave (arrow D). Meanwhile, the power supplying unit 230 uses the second coil 231 to receive the electromagnetic wave (arrow D) from the temperature measuring unit 210, and transmits the receiving signal P5 including the temperature information to the main body unit 240 via the cable 235 (Step ST5).

Subsequently, the microcomputer 243 of the main body unit 240 receives the received receiving signal P5 as an input via the coil transmission/reception unit 247, and determines whether or not the receiving signal P5 is normal. If a normal value is determined, the microcomputer 243 stores the temperature information (temperature T1 obtained by the first temperature sensing element 221 directly measuring the body temperature of the skin 206 of the subject) in the memory 244, and the procedure advances to the subsequent Step ST7, and if the information is not normal due to a reception error or the like, Steps ST4 to ST6 are repeated to execute the temperature measurement and the receiving operation again (Step ST6).

Subsequently, if the reception from the temperature measuring unit 210 is normal, the microcomputer 243 of the main body unit 240 controls the A/D conversion unit 248 to convert the temperature signal P7 from the second temperature sensing element 232 of the power supplying unit 230 into digital data, inputs the digital data as the temperature data P9, and stores the temperature information in the memory 244 (Step ST7). The temperature information stored here is the body temperature of the skin 206 of the subject whose heat has been transmitted through the heat flow path H1 formed by integrally coupling the first thermal resistor 212 and the second thermal resistor 233 to each other, in other words, the above-mentioned temperature T2.

Subsequently, the microcomputer 243 of the main body unit 240 reads the temperatures T1 and T2, which are sequentially obtained by the two temperature sensing elements coupled to each other with the heat flow path H1, from the memory 244 and, as described above, solves the known heat conduction equation to thereby calculate the deep body temperature of the skin 206 of the subject (Step ST8).

Subsequently, the microcomputer 243 of the main body unit 240 transmits the calculated deep body temperature to the display unit 242 as the display signal P12, and the display unit 242 displays the calculated deep body temperature (Step ST9). Note that, if the temperature measuring device 201 has a specification to transmit the temperature information to an external device (not shown), the calculated deep body temperature is transmitted to the antenna transmission/reception unit 245 as the communication signal P13, and the antenna transmission/reception unit 245 uses the antenna 246 to perform transmission/reception with the external device and sequentially transmit the acquired temperature information. Further, the microcomputer 243 receives the control signal from the external device through the antenna transmission/reception unit 245, and can have a function of, based on the control signal from the external portion, starting or ending the measurement, collectively transmitting data within the memory 244, or the like.

Here, by providing the external device (not shown) that receives the temperature information from the main body unit 240 with a bulk memory or a monitor for performing graph display, it is possible to record the body temperature of the subject for a long period of time and possible to confirm a change in body temperature and the like in real time. Therefore, it is possible to use the temperature measuring device according to the present invention to perform the continuous measurement of the deep body temperature twenty-four hours a day and possible to use the external device that is placed in a position apart from the subject to continuously observe the subject's (patient's) condition and immediately handle an abrupt change in the condition or the like.

Fifth Embodiment

Figure 17:
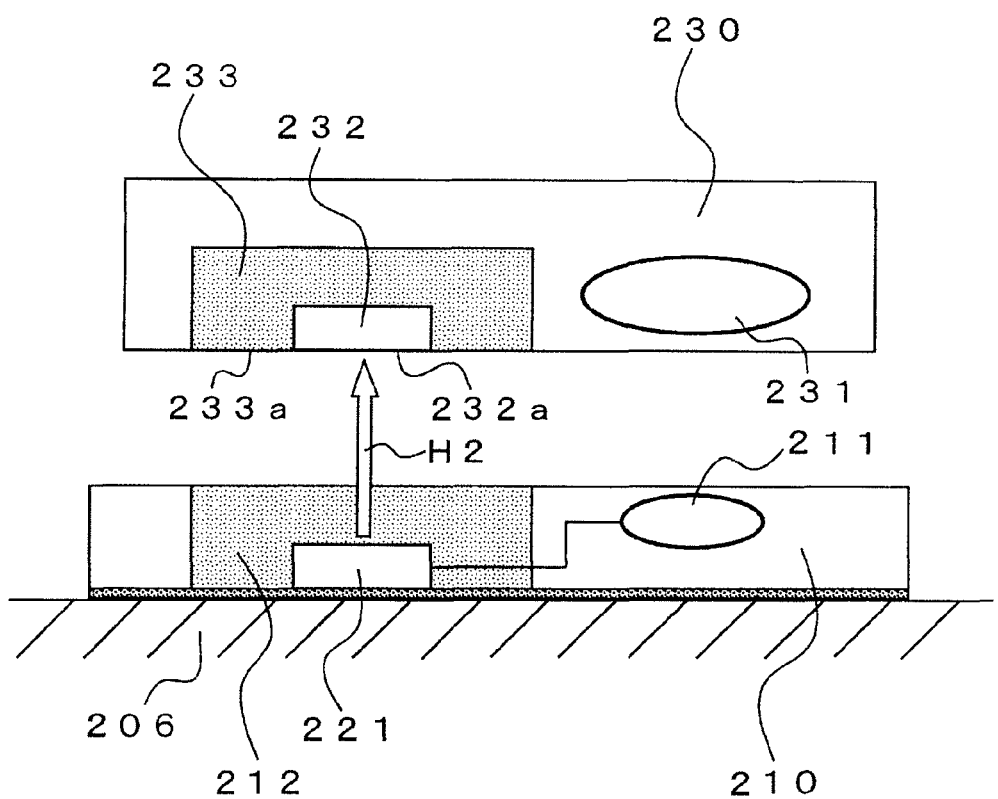
FIG. 17 is a schematic side view illustrating a structure of a temperature measuring device according to a fifth embodiment of the present invention.

Next, referring to FIG. 17, description is made of the structure of a temperature measuring device according to the fifth embodiment. Note that, a basic structure of the fifth embodiment is the same as that of the fourth embodiment, and hence the same components are denoted by the same reference numerals, duplicate description of which is partially omitted.

In FIG. 17, in the same manner as in the fourth embodiment, the temperature measuring device according to the fifth embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration. Further, the temperature measuring unit 210 has the same structure as in the fourth embodiment, and hence description thereof is omitted.

The power supplying unit 230 according to the fifth embodiment is different from the power supplying unit 230 according to the fourth embodiment in a positional relationship between the second temperature sensing element 232 and the second thermal resistor 233. Specifically, the second temperature sensing element 232 according to the fifth embodiment is covered with the second thermal resistor 233 so as to be included therein, but a surface of the second temperature sensing element 232 which is opposed to the first temperature sensing element 221 of the temperature measuring unit 210, in other words, an under surface 232a of the second temperature sensing element 232 in FIG. 17, is installed so as to be exposed from the under surface 233a of the second thermal resistor 233.

According to this structure, in a case where the temperature measuring unit 210 and the power supplying unit 230 according to the fifth embodiment are integrated in close contact with each other, only the first thermal resistor 212 exists between the first temperature sensing element 221 and the second temperature sensing element 232 that are opposed to each other, and hence a heat flow path H2 obtained by coupling the first temperature sensing element 221 to the second temperature sensing element 232 is formed only of the first thermal resistor 212.

As a result, the heat flow path H2 depends only on heat insulation characteristics (thermal conductivity) of the first thermal resistor 212, and hence the characteristics of the heat flow path H2 become stable, which can improve the accuracy of the calculated deep body temperature. Further, if the thermal conductivities of the first thermal resistor 212 and the second thermal resistor 233 are equalized, by integrating the temperature measuring unit 210 and the power supplying unit 230 in close contact with each other, the first thermal resistor 212 and the second thermal resistor 233 are integrated in terms of the characteristics, and hence the characteristics the heat flow path H2 become more stable, which can improve the accuracy and the stability of the temperature measuring device.

Note that, the operation of the temperature measurement according to the fifth embodiment is basically the same as the operation described above according to the fourth embodiment (see FIG. 16), and hence description thereof is omitted. Further, the operations according to the sixth to eleventh embodiments described later are the same as the operation according to the fourth embodiment, and hence description thereof is omitted. Further, the second thermal resistor 233 is not limited to the shape illustrated in FIG. 17, and may have such a shape that, for example, a top surface of the second temperature sensing element 232 is also exposed. Further, the second thermal resistor 233 may not necessarily be provided.

Sixth Embodiment

Figure 18:
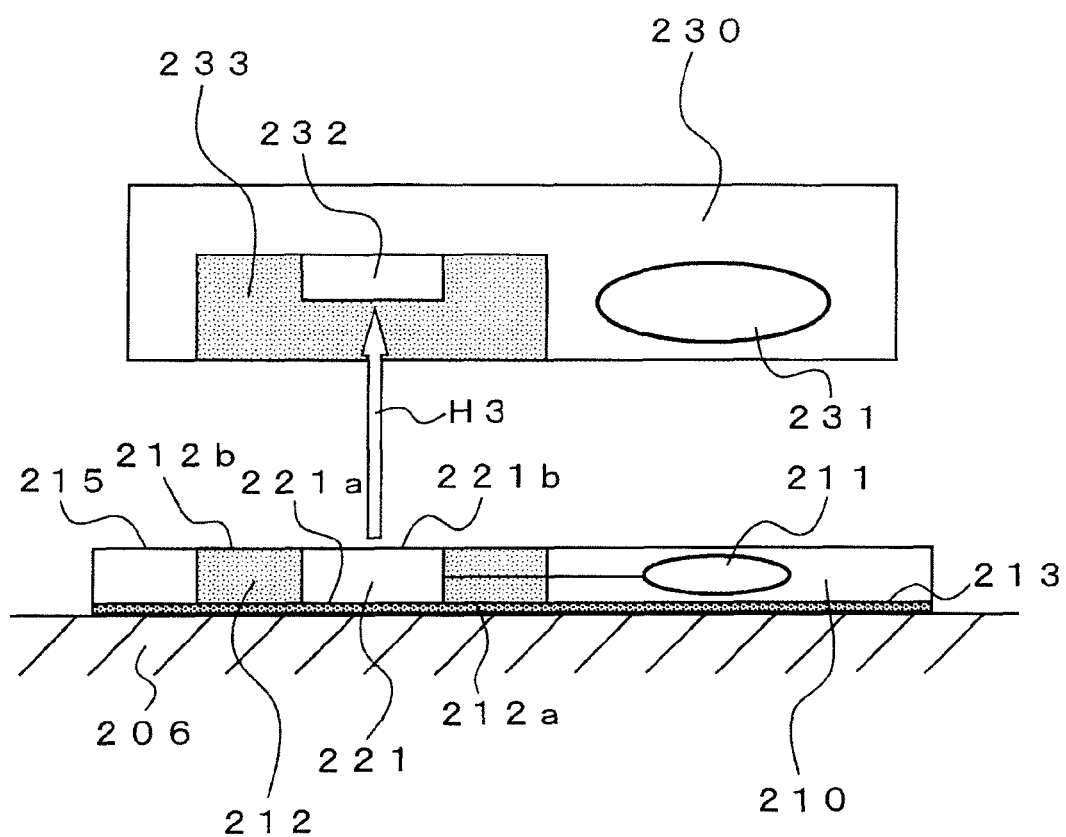
FIG. 18 is a schematic side view illustrating a structure of a temperature measuring device according to a sixth embodiment of the present invention.

Next, referring to FIG. 18, description is made of the structure of a temperature measuring device according to the sixth embodiment. Note that, a basic structure of the sixth embodiment is the same as that of the fourth embodiment, and hence the same components are denoted by the same reference numerals, duplicate description of which is partially omitted.

In FIG. 18, in the same manner as in the fourth embodiment, the temperature measuring device according to the sixth embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration. Further, the power supplying unit 230 has the same structure as in the fourth embodiment, and hence description thereof is omitted.

The temperature measuring unit 210 according to the sixth embodiment is different from the temperature measuring unit 210 according to the fourth embodiment in that the temperature measuring unit 210 according to the sixth embodiment has a small thickness. Specifically, the temperature measuring unit 210 according to the sixth embodiment is structured to have substantially the same thickness as the thickness of the built-in first temperature sensing element 221 (in actuality, thickness of the control IC 220 into which the first temperature sensing element 221 is built; see FIG. 14). Therefore, the under surface 221a of the first temperature sensing element 221 of the temperature measuring unit 210 is exposed from the under surface 212a of the first thermal resistor 212. Further, a surface of the first temperature sensing element 221 which is opposed to the second temperature sensing element 232 of the power supplying unit 230, in other words, a top surface 221b of the first temperature sensing element 221, is exposed from a top surface 212b of the first thermal resistor 212. Accordingly, the two top and under surfaces of the first temperature sensing element 221 are formed in proximity to the top surface 215 and the under surface 213 of the temperature measuring unit 210.

According to this structure, in a case where the temperature measuring unit 210 and the power supplying unit 230 according to the sixth embodiment are integrated in close contact with each other, only the second thermal resistor 233 exists between the first temperature sensing element 221 and the second temperature sensing element 232, and hence a heat flow path H3 obtained by coupling the first temperature sensing element 221 to the second temperature sensing element 232 is formed only of the second thermal resistor 233.

As a result, the heat flow path H3 depends only on heat insulation characteristics (thermal conductivity) of the second thermal resistor 233, and hence the characteristics of the heat flow path H3 become stable, which can improve the accuracy of the calculated deep body temperature. Further, because the temperature measuring unit 210 has a small thickness, it is possible to obtain temperature measuring device easy to handle which hardly brings discomfort to the subject when the temperature measuring unit 210 is attached to the subject. Further, because the temperature measuring unit 210 has a small thickness, it is possible to reduce the cost of materials and the like, further lower the cost of the temperature measuring unit 210 supposed to be disposed of after one use, and provide a temperature measuring device having a higher usability.

Seventh Embodiment

Figure 19:
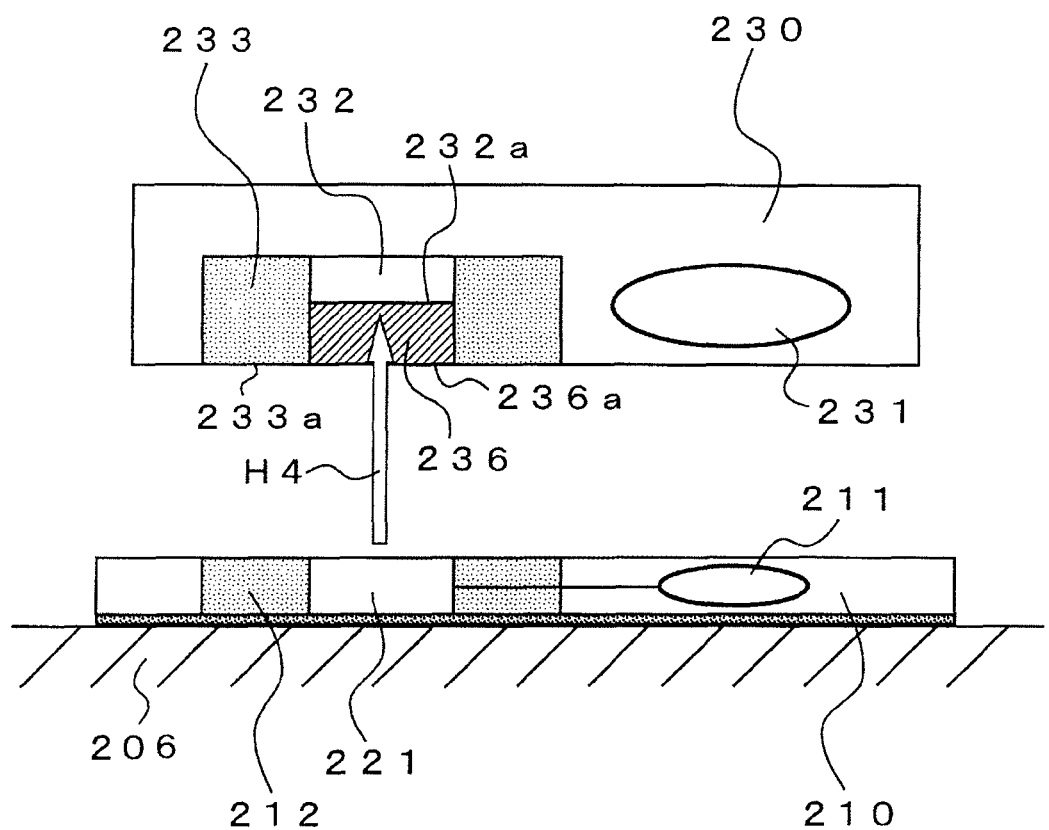
FIG. 19 is a schematic side view illustrating a structure of a temperature measuring device according to a seventh embodiment of the present invention.

Next, referring to FIG. 19, description is made of the structure of a temperature measuring device according to the seventh embodiment. Note that, a basic structure of the seventh embodiment is the same as that of the fourth embodiment, and hence the same components are denoted by the same reference numerals, duplicate description of which is partially omitted.

In FIG. 19, in the same manner as in the fourth embodiment, the temperature measuring device according to the seventh embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration. Further, the temperature measuring unit 210 has the same structure as in the sixth embodiment described above (see FIG. 18), and hence description thereof is omitted.

The power supplying unit 230 according to the seventh embodiment is different from the power supplying unit 230 according to the fourth embodiment in that a third thermal resistor 236 is installed in contact with the surface of the second temperature sensing element 232 of the power supplying unit 230 which is opposed to the first temperature sensing element 221 of the temperature measuring unit 210, in other words, the under surface 232a of the second temperature sensing element 232. Further, the third thermal resistor 236 has the periphery covered with the second thermal resistor 233, and an under surface 236a of the third thermal resistor 236 is exposed from the under surface 233a of the second thermal resistor 233.

According to this structure, in a case where the temperature measuring unit 210 and the power supplying unit 230 according to the seventh embodiment are integrated in close contact with each other, only the third thermal resistor 236 exists between the first temperature sensing element 221 and the second temperature sensing element 232, and hence a heat flow path H4 obtained by coupling the first temperature sensing element 221 to the second temperature sensing element 232 is formed only of the third thermal resistor 236.

As a result, the heat flow path H4 depends only on heat insulation characteristics (thermal conductivity) of the third thermal resistor 236, and hence the characteristics of the heat flow path H4 become stable, which can improve the accuracy of the calculated deep body temperature. Further, by setting a thermal conductivity of the third thermal resistor 236 higher than the thermal conductivities of the first thermal resistor 212 and the second thermal resistor 233, it is possible to prevent diffusion of a heat flow from the heat flow path H4 in a horizontal direction and to improve the accuracy of temperature measurement. Further, because the temperature measuring unit 210 has a small thickness, it is possible to obtain the same effect as in the sixth embodiment.

Eighth Embodiment

Figure 20:
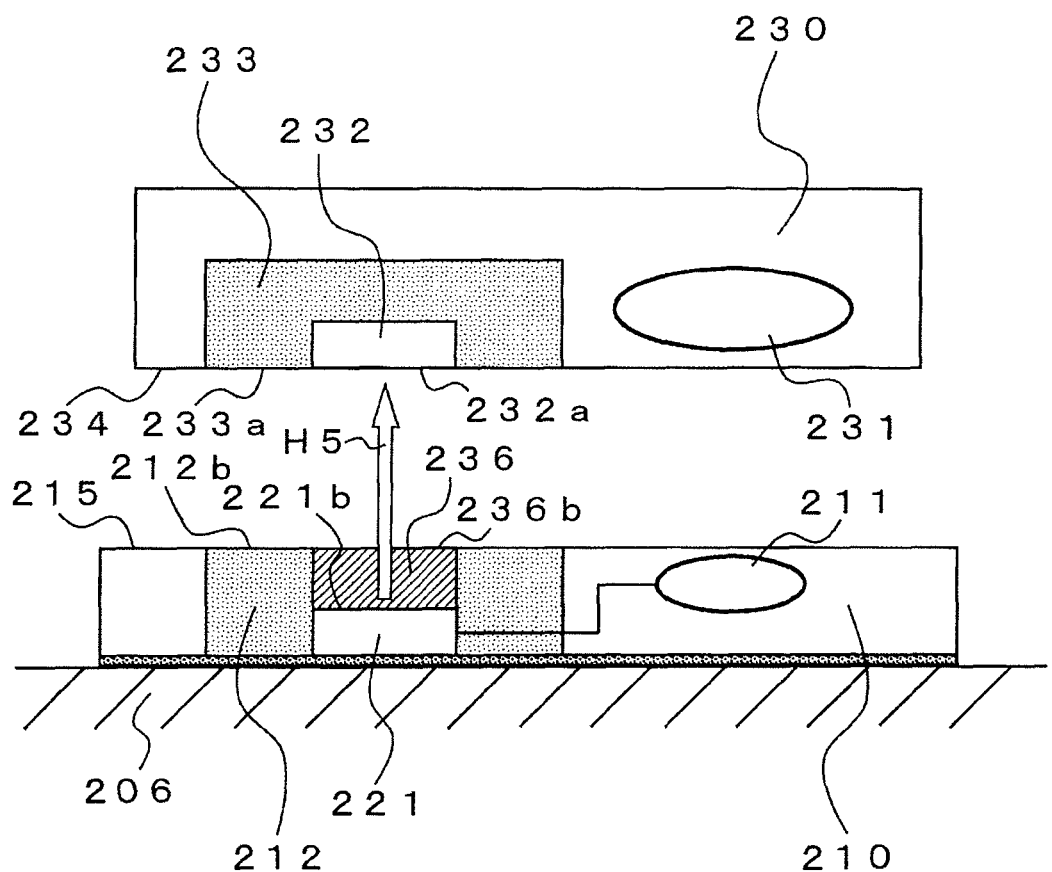
FIG. 20 is a schematic side view illustrating a structure of a temperature measuring device according to an eighth embodiment of the present invention.

Next, referring to FIG. 20, description is made of the structure of a temperature measuring device according to the eighth embodiment. Note that, a basic structure of the eighth embodiment is the same as that of the fourth embodiment, and hence the same components are denoted by the same reference numerals, duplicate description of which is partially omitted.

In FIG. 20, in the same manner as in the fourth embodiment, the temperature measuring device according to the eighth embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration.

The temperature measuring unit 210 according to the eighth embodiment is different from the temperature measuring unit 210 according to the fourth embodiment in that the third thermal resistor 236 is installed in contact with the surface of the first temperature sensing element 221 which is opposed to the second temperature sensing element 232 of the power supplying unit 230, in other words, the top surface 221b of the first temperature sensing element 221. Further, the third thermal resistor 236 has the periphery covered with the first thermal resistor 212, and a top surface 236b of the third thermal resistor 236 is exposed from the top surface 212b of the first thermal resistor 212.

Further, the power supplying unit 230 according to the eighth embodiment is different from the power supplying unit 230 according to the fourth embodiment in the same point as in the fifth embodiment. The second temperature sensing element 232 is covered with the second thermal resistor 233 so as to be included therein, but the under surface 232a of the second temperature sensing element 232 is installed so as to be exposed from the under surface 233a of the second thermal resistor 233.

According to this structure, in a case where the temperature measuring unit 210 and the power supplying unit 230 according to the eighth embodiment are integrated in close contact with each other, only the third thermal resistor 236 installed in the temperature measuring unit 210 exists between the first temperature sensing element 221 and the second temperature sensing element 232, and hence a heat flow path H5 obtained by coupling the first temperature sensing element 221 to the second temperature sensing element 232 is formed only of the third thermal resistor 236.

As a result, the heat flow path H5 depends only on heat insulation characteristics (thermal conductivity) of the third thermal resistor 236, and hence the characteristics of the heat flow path H5 become stable, which can improve the accuracy of the calculated deep body temperature. Further, by setting the thermal conductivity of the third thermal resistor 236 higher than the thermal conductivities of the first thermal resistor 212 and the second thermal resistor 233, it is possible to prevent diffusion of a heat flow from the heat flow path H5 in the horizontal direction and to improve the accuracy of temperature measurement.

Note that, the second thermal resistor 233 is not limited to the shape illustrated in FIG. 20, and may have such a shape that, for example, the top surface of the second temperature sensing element 232 is also exposed. Further, the second thermal resistor 233 may not necessarily be provided.

Ninth Embodiment

Figure 21:
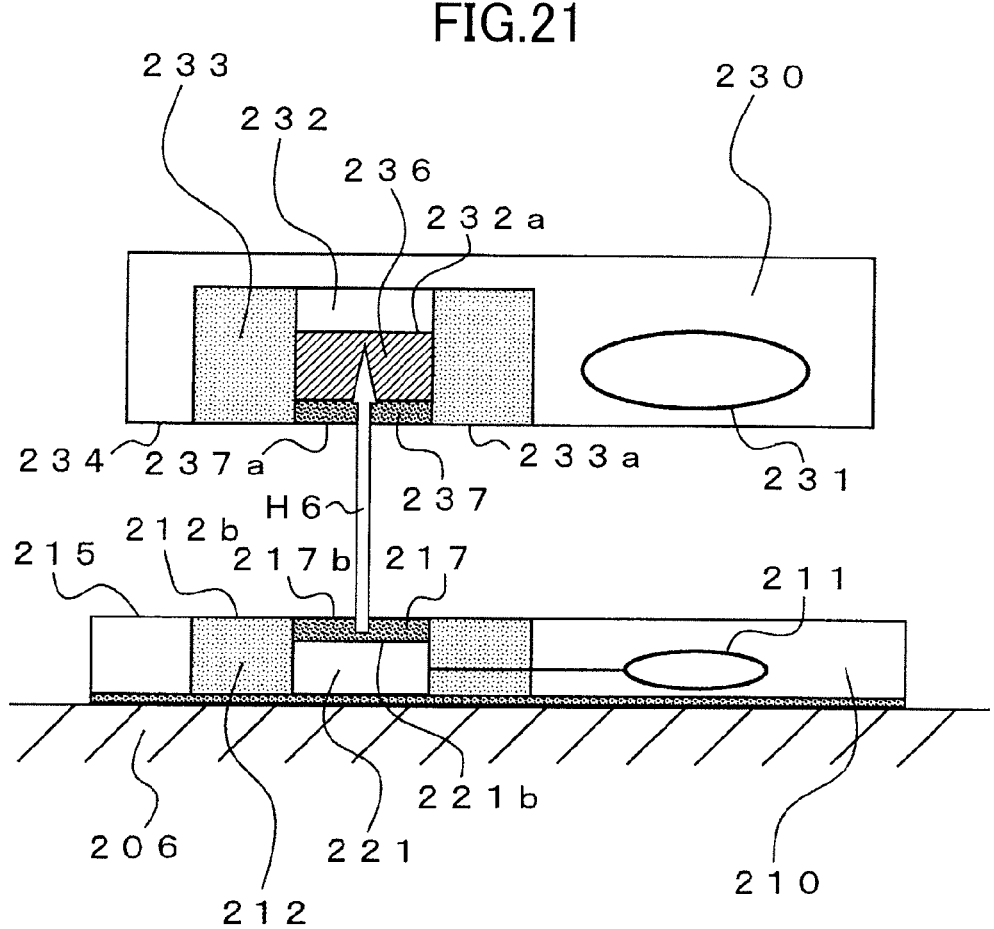
FIG. 21 is a schematic side view illustrating a structure of a temperature measuring device according to a ninth embodiment of the present invention.

Next, referring to FIG. 21, description is made of the structure of a temperature measuring device according to the ninth embodiment. Note that, a basic structure of the ninth embodiment is the same as that of the fourth embodiment, and hence the same components are denoted by the same reference numerals, duplicate description of which is partially omitted.

In FIG. 21, in the same manner as in the fourth embodiment, the temperature measuring device according to the ninth embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration.

The temperature measuring unit 210 according to the ninth embodiment is different from the temperature measuring unit 210 according to the fourth embodiment in that a first magnetic substance 217 is installed in contact with the surface of the first temperature sensing element 221 which is opposed to the second temperature sensing element 232 of the power supplying unit 230, in other words, the top surface 221b of the first temperature sensing element 221. Further, the first magnetic substance 217 has the periphery covered with the first thermal resistor 212, and a top surface 217b of the first magnetic substance 217 is exposed from the top surface 212b of the first thermal resistor 212, and the top surface 215 of the temperature measuring unit 210.

Further, the power supplying unit 230 according to the ninth embodiment is different from the power supplying unit 230 according to the fourth embodiment in that the third thermal resistor 236 and a second magnetic substance 237 are stacked one on the other in contact with the surface of the second temperature sensing element 232 which is opposed to the first temperature sensing element 221, in other words, the under surface 232a of the second temperature sensing element 232. Further, the third thermal resistor 236 and the second magnetic substance 237 have the periphery covered with the second thermal resistor 233, and an under surface 237a of the second magnetic substance 237 is exposed from the under surface 233a of the second thermal resistor 233 and the under surface 234 of the power supplying unit 230.

With this structure, when the temperature measuring unit 210 and the power supplying unit 230 according to the ninth embodiment are brought into close contact with each other, a force that attracts the temperature measuring unit 210 and the power supplying unit 230 to each other is caused by respective magnetic forces of the first magnetic substance 217 on the side of the temperature measuring unit 210 and the second magnetic substance 237 on the side of the power supplying unit 230, and hence the temperature measuring unit 210 and the power supplying unit 230 can reliably be integrated in close contact with each other.

Note that, if the temperature measuring unit 210 and the power supplying unit 230 are sufficiently brought into close contact with each other by the magnetic forces of the first magnetic substance 217 and the second magnetic substance 237, there is no need to provide the above-mentioned adhesive or the adhesive surface processing which brings the temperature measuring unit 210 and the power supplying unit 230 into close contact with each other. In this manner, the temperature measuring unit 210 and the power supplying unit 230 can be attached/detached by the magnetic forces of the first magnetic substance 217 and the second magnetic substance 237, which is advantageous in that the adhesion force is not deteriorated even if the attachment and the detachment are repeatedly performed by using the magnetic force.

Further, by reducing the thicknesses of the first magnetic substance 217 and the second magnetic substance 237 and using a material small in heat resistance, in the case where the temperature measuring unit 210 and the power supplying unit 230 are integrated in close contact with each other, the thermal resistance between the first temperature sensing element 221 and the second temperature sensing element 232 becomes only the third thermal resistor 236 installed in the power supplying unit 230, and hence a heat flow path H6 obtained by coupling the first temperature sensing element 221 to the second temperature sensing element 232 is formed only of the third thermal resistor 236.

As a result, because the temperature measuring unit 210 and the power supplying unit 230 are brought into close contact with each other by the magnetic force, a positional displacement hardly occurs, and the heat flow path H6 is reliably formed with ease. Further, the heat flow path H6 depends only on heat insulation characteristics (thermal conductivity) of the third thermal resistor 236, and hence the characteristics of the heat flow path H6 become stable, which can improve the accuracy of the calculated deep body temperature. Further, by setting the thermal conductivity of the third thermal resistor 236 higher than the thermal conductivities of the first thermal resistor 212 and the second thermal resistor 233, it is possible to prevent diffusion of the heat flow from the heat flow path H6 in the horizontal direction and to improve the accuracy of temperature measurement.

Tenth Embodiment

Figure 22:
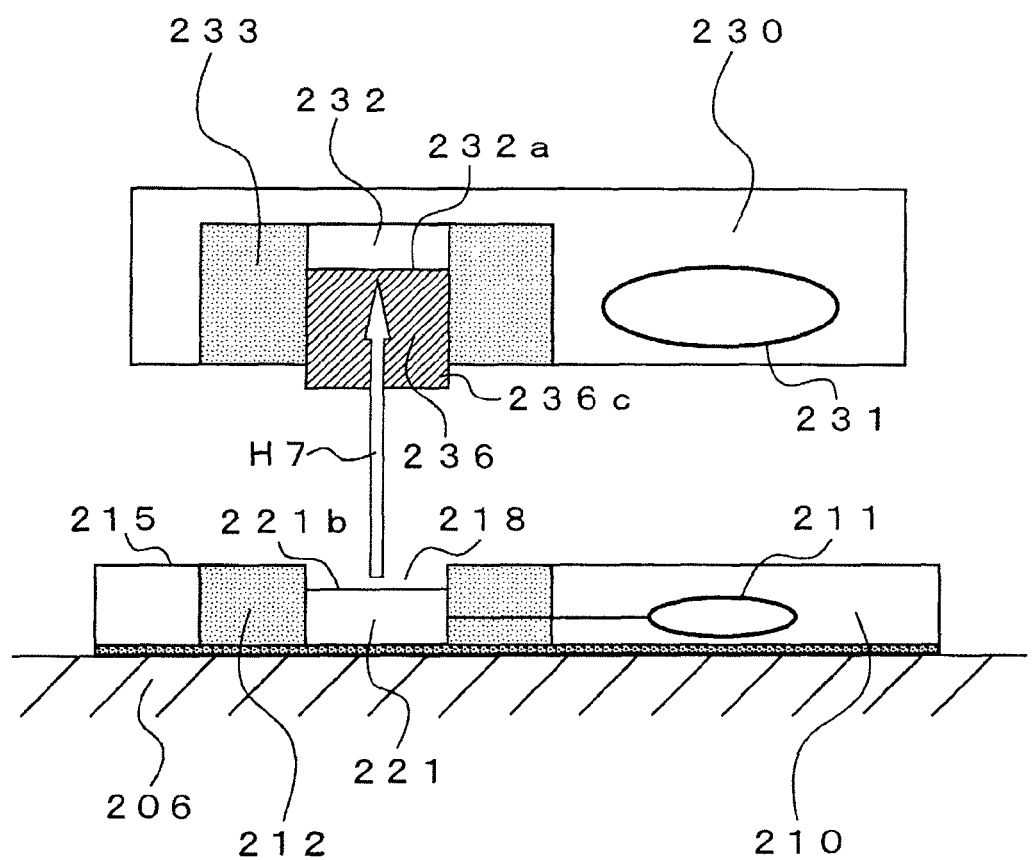
FIG. 22 is a schematic side view illustrating a structure of a temperature measuring device according to a tenth embodiment of the present invention.

Next, referring to FIG. 22, description is made of the structure of a temperature measuring device according to the tenth embodiment. Note that, a basic structure of the tenth embodiment is the same as that of the fourth embodiment, and hence the same components are denoted by the same reference numerals, duplicate description of which is partially omitted.

In FIG. 22, in the same manner as in the fourth embodiment, the temperature measuring device according to the tenth embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration.

The temperature measuring unit 210 according to the tenth embodiment is different from the temperature measuring unit 210 according to the fourth embodiment in that a concave portion 218 is formed by the first thermal resistor 212 that covers the first temperature sensing element 221 on the surface of the first temperature sensing element 221 which is opposed to the second temperature sensing element 232 of the power supplying unit 230, in other words, the top surface 221b of the first temperature sensing element 221. The concave portion 218 is exposed from the top surface 215 of the temperature measuring unit 210.

Further, the power supplying unit 230 according to the tenth embodiment is different from the power supplying unit 230 according to the fourth embodiment in that the third thermal resistor 236 is installed in contact with the surface of the second temperature sensing element 232 which is opposed to the first temperature sensing element 221, in other words, the under surface 232a of the second temperature sensing element 232. Further, the third thermal resistor 236 has the periphery covered with the second thermal resistor 233, and includes a convex portion 236c that protrudes from the second thermal resistor 233. The shapes (sizes and depths) of the concave portion 218 and the convex portion 236c are decided so that the convex portion 236c on the side of the power supplying unit 230 is fitted into the concave portion 218 on the side of the temperature measuring unit 210.

With this structure, when the temperature measuring unit 210 and the power supplying unit 230 according to the tenth embodiment are brought into close contact with each other, the convex portion 236c on the side of the power supplying unit 230 is fitted into the concave portion 218 on the side of the temperature measuring unit 210, and the temperature measuring unit 210 and the power supplying unit 230 can reliably be integrated in close contact with each other. In other words, the concave portion 218 and the convex portion 236c have a function of performing positioning when the temperature measuring unit 210 and the power supplying unit 230 are brought into close contact with each other.

Further, in the case where the temperature measuring unit 210 and the power supplying unit 230 are integrated in close contact with each other, only the third thermal resistor 236 of the power supplying unit 230 exists between the first temperature sensing element 221 and the second temperature sensing element 232, and hence a heat flow path H7 obtained by coupling the first temperature sensing element 221 to the second temperature sensing element 232 is formed only of the third thermal resistor 236.

As a result, because the temperature measuring unit 210 and the power supplying unit 230 are positioned by having the convex portion 236c fitted into the concave portion 218 and reliably brought into close contact with each other, the positional displacement does not occur, and the heat flow path H6 is reliably formed with ease. Further, the heat flow path H7 depends only on the heat insulation characteristics (thermal conductivity) of the third thermal resistor 236, and hence the characteristics of the heat flow path H7 become stable, which can improve the accuracy of the calculated deep body temperature. Further, by setting the thermal conductivity of the third thermal resistor 236 higher than the thermal conductivities of the first thermal resistor 212 and the second thermal resistor 233, it is possible to prevent diffusion of the heat flow from the heat flow path H7 in the horizontal direction and to improve the accuracy of temperature measurement.

Eleventh Embodiment

Figure 23:
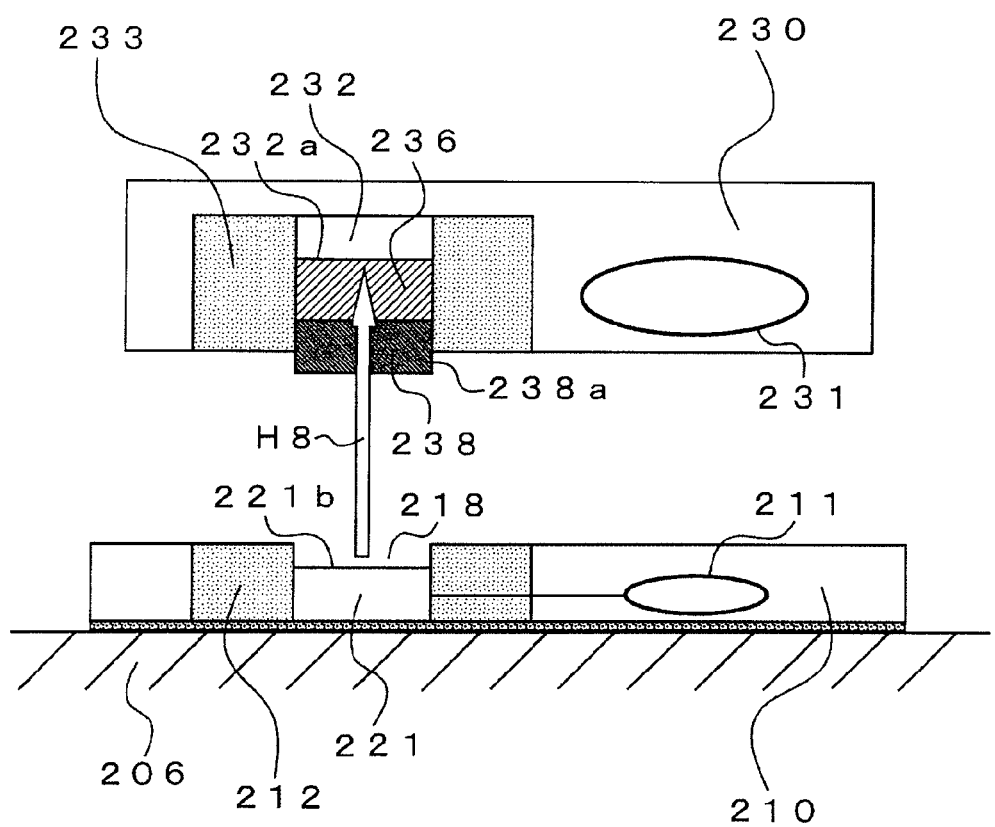
FIG. 23 is a schematic side view illustrating a structure of a temperature measuring device according to an eleventh embodiment of the present invention.
Figure 24A:
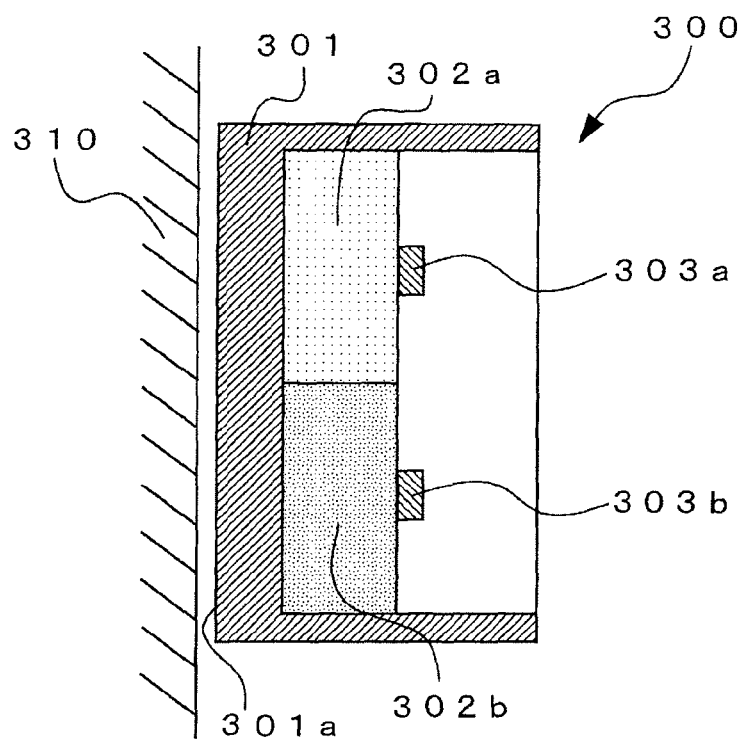
FIG. 24A is a sectional view illustrating a structure of a probe of a conventional electronic clinical thermometer.
Figure 24B:
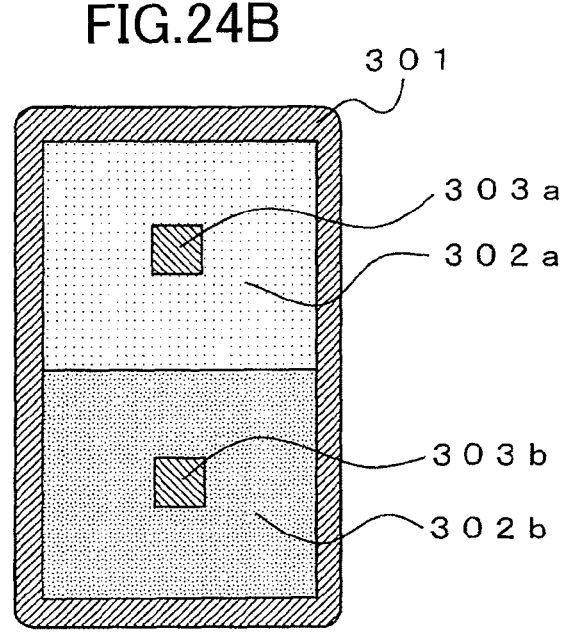
FIG. 24B is a front view illustrating the structure of the probe of the conventional electronic clinical thermometer.
Figure 25:
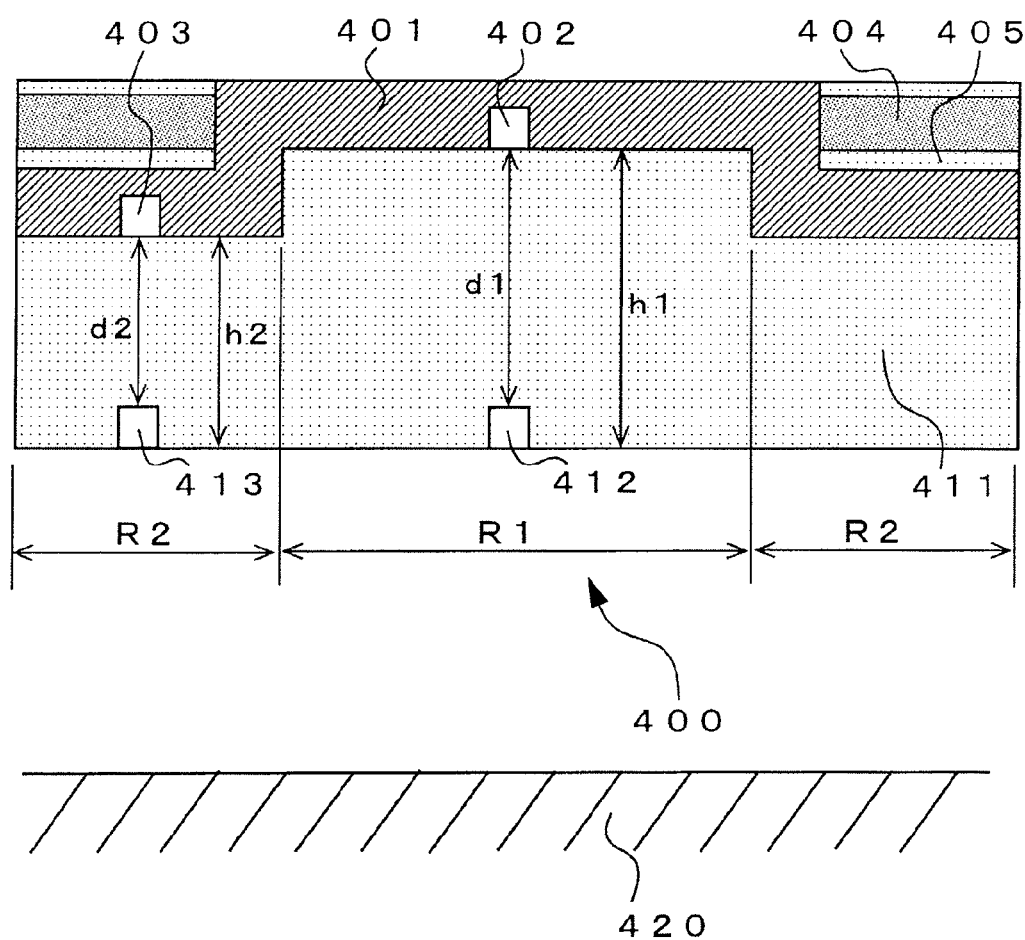
FIG. 25 is a sectional view illustrating a structure of a probe of a conventional deep temperature measuring device.

Next, referring to FIG. 23, description is made of the structure of a temperature measuring device according to the eleventh embodiment. Note that, a basic structure of the eleventh embodiment is the same as that of the fourth embodiment, and hence the same components are denoted by the same reference numerals, duplicate description of which is partially omitted.

In FIG. 23, in the same manner as in the fourth embodiment, the temperature measuring device according to the eleventh embodiment includes the temperature measuring unit 210, the power supplying unit 230, and the main body unit 240. Note that, the main body unit 240 and the cable 235 are the same as those of the fourth embodiment (see FIG. 11), and therefore are omitted from the illustration.

The temperature measuring unit 210 according to the eleventh embodiment has the same structure as in the temperature measuring unit 210 according to the above-mentioned tenth embodiment, and hence description thereof is omitted. In other words, in the temperature measuring unit 210 according to the eleventh embodiment, the concave portion 218 is formed by the first thermal resistor 212 on the top surface 221b of the first temperature sensing element 221.

Further, the power supplying unit 230 according to the eleventh embodiment is different from the power supplying unit 230 according to the fourth embodiment in that the third thermal resistor 236 and a thermal conductor 238 (for example, metal) are stacked one on the other in contact with the surface of the second temperature sensing element 232 which is opposed to the first temperature sensing element 221, in other words, the under surface 232a of the second temperature sensing element 232. Further, the third thermal resistor 236 and the thermal conductor 238 have the periphery covered with the second thermal resistor 233, and the thermal conductor 238 includes a convex portion 238a that protrudes from the second thermal resistor 233. The concave portion 218 and the convex portion 238a are formed so that the convex portion 238a on the side of the power supplying unit 230 is fitted into the concave portion 218 on the side of the temperature measuring unit 210. Here, the deep body temperature is calculated by using not the thermal conductor 238 but the third thermal resistor 236. The thermal conductor 238 is used to perform the positioning between the temperature measuring unit 210 and the power supplying unit 230 (described later), and the thermal resistance can be assumed to be zero.

With this structure, when the temperature measuring unit 210 and the power supplying unit 230 according to the eleventh embodiment are brought into close contact with each other, the convex portion 238a on the side of the power supplying unit 230 is fitted into the concave portion 218 on the side of the temperature measuring unit 210, and the temperature measuring unit 210 and the power supplying unit 230 can reliably be integrated in close contact with each other. In other words, the concave portion 218 and the convex portion 238a have the function of performing positioning when the temperature measuring unit 210 and the power supplying unit 230 are brought into close contact with each other. Further, a heat flow path H8 obtained by coupling the first temperature sensing element 221 to the second temperature sensing element 232 in the case where the temperature measuring unit 210 and the power supplying unit 230 are integrated in close contact with each other is formed of the third thermal resistor 236 and the thermal conductor 238.

As a result, when the temperature measuring unit 210 and the power supplying unit 230 are brought into close contact with each other, the temperature measuring unit 210 and the power supplying unit 230 are positioned by having the convex portion 238a of the thermal conductor 238 on the side of the power supplying unit 230 fitted into the concave portion 218 of the first thermal resistor 212 on the side of the temperature measuring unit 210 and are reliably brought into close contact with each other. Accordingly, the positional displacement does not occur, and the heat flow path H8 is reliably formed with ease. Further, the first thermal resistor 212 on the side of the temperature measuring unit 210 and the first thermal resistor 238 on the side of the power supplying unit 230 have the same thermal conductivities and the same characteristics, and hence the temperature measuring unit 210 and the power supplying unit 230 are formed by being thermally coupled to each other with more reliability.

Further, by setting the thermal conductivity of the third thermal resistor 236 higher than the thermal conductivities of the first thermal resistor 212, 238 and the second thermal resistor 233, it is possible to prevent diffusion of the heat flow from the heat flow path H8 in the horizontal direction and to improve the accuracy of temperature measurement.

Note that, the block diagrams, the flowcharts, and the like illustrated in the embodiments of the present invention are mere examples and the present invention is not limited thereto. The block diagrams, the flowcharts, and the like may be arbitrarily changed as long as the gist of the present invention is satisfied. Further, in the fifth to eleventh embodiments, the close contact state between the temperature measuring unit 210 and the power supplying unit 230 is the same as the close contact state according to the fourth embodiment (see FIG. 12), and therefore is omitted from the illustration.

The temperature measuring device according to the present invention is thin and lightweight and can continuously measure and record the body temperature of the subject with high precision, and therefore can be widely used as a high-precision, high-functionality clinical thermometer that always carries out suitable medical care for the subject. Alternatively, the temperature measuring device according to the present invention can continuously measure and record the deep body temperature that is important in body temperature management, monitoring of a bloodstream state, and the like during a surgical operation, and therefore can be widely used in various medical institutions as the high-precision, high-functionality clinical thermometer that always provides suitable medical care to the subject.

While there have been described what are at present considered to be certain embodiments of the invention, it will be understood that various modifications may be made thereto, and it is intended that the appended claims cover all such modifications and do not limited to written embodiments themselves.

What is claimed is:

1. A temperature measuring device, comprising:
a temperature measuring unit to be attached to an object to be measured, comprising a temperature measuring unit-side temperature sensing element and a first coil; and
a power supplying unit comprising a second coil, the power supplying unit supplying power to the temperature measuring unit by supplying power from the second coil to the first coil using an induced electromotive force,
wherein the temperature measuring unit and the power supplying unit are formed integrally with each other.

2. The temperature measuring device according to claim 1, wherein the temperature measuring unit and the power supplying unit are integrally formed via a heat insulating portion.

3. The temperature measuring device according to claim 2, wherein the heat insulating portion and one of the temperature measuring unit and the power supplying unit are detachably attachable to each other.

4. The temperature measuring device according to claim 2, wherein the power supplying unit is connected in a wired manner to a main body comprising a power source.

5. The temperature measuring device according to claim 2, wherein the power supplying unit is integrated with a main body comprising a power source.

6. The temperature measuring device according to claim 1, wherein:
the power supplying unit further comprises a power supplying unit-side temperature sensing element; and
the temperature measuring unit and the power supplying unit are stacked one on the other in a close contact state, and the temperature measuring unit-side temperature sensing element and the power supplying unit-side temperature sensing element are opposed to each other.

7. The temperature measuring device according to claim 6, wherein the temperature measuring unit and the power supplying unit are detachably attachable to each other.

8. The temperature measuring device according to claim 6, wherein the power supplying unit is connected to a main body comprising a power source.

9. The temperature measuring device according to claim 6, wherein:
the temperature measuring unit-side temperature sensing element has at least a part covered with a first thermal resistor; and
the power supplying unit-side temperature sensing element has at least a part covered with a second thermal resistor.

10. The temperature measuring device according to claim 9, wherein, in said close contact state, the temperature measuring unit-side temperature sensing element and the power supplying unit-side temperature sensing element have a heat flow path formed therebetween by the first thermal resistor and the second thermal resistor.

11. The temperature measuring device according to claim 10, wherein:
the temperature measuring unit-side temperature sensing element is thermally coupled directly to a surface of the object to be measured; and
the power supplying unit-side temperature sensing element is thermally coupled to the object to be measured via the heat flow path.

12. The temperature measuring device according to claim 9, wherein:
a surface of the power supplying unit-side temperature sensing element which is opposed to the temperature measuring unit-side temperature sensing element is exposed from the second thermal resistor; and
in said close contact state, the temperature measuring unit-side temperature sensing element and the power supplying unit-side temperature sensing element have a heat flow path formed therebetween by the first thermal resistor.

13. The temperature measuring device according to claim 9, wherein:
a surface of the temperature measuring unit-side temperature sensing element which is opposed to the power supplying unit-side temperature sensing element is exposed from the first thermal resistor; and
in said close contact state, the temperature measuring unit-side temperature sensing element and the power supplying unit-side temperature sensing element have a heat flow path formed therebetween by the second thermal resistor.

14. The temperature measuring device according to claim 9, wherein:
a surface of the temperature measuring unit-side temperature sensing element which is opposed to the power supplying unit-side temperature sensing element is exposed from the first thermal resistor;
a surface of the power supplying unit-side temperature sensing element which is opposed to the temperature measuring unit-side temperature sensing element is brought into contact with a third thermal resistor; and
in said close contact state, the temperature measuring unit-side temperature sensing element and the power supplying unit-side temperature sensing element have a heat flow path formed therebetween by the third thermal resistor.

15. The temperature measuring device according to claim 14, wherein the third thermal resistor has a thermal conductivity higher than any one of thermal conductivities of the first thermal resistor and the second thermal resistor.

16. The temperature measuring device according to claim 9, wherein:
a surface of the temperature measuring unit-side temperature sensing element which is opposed to the power supplying unit-side temperature sensing element is brought into contact with a third thermal resistor;
a surface of the power supplying unit-side temperature sensing element which is opposed to the temperature measuring unit-side temperature sensing element is exposed from the second thermal resistor; and
in said close contact state, the temperature measuring unit-side temperature sensing element and the power supplying unit-side temperature sensing element have a heat flow path formed therebetween by the third thermal resistor.

17. The temperature measuring device according to claim 9, wherein:
- a surface of the temperature measuring unit-side temperature sensing element which is opposed to the power supplying unit-side temperature sensing element is brought into contact with a first magnetic substance;
- a surface of the power supplying unit-side temperature sensing element which is opposed to the temperature measuring unit-side temperature sensing element has a third thermal resistor and a second magnetic substance stacked one on the other; and
- in said close contact state, the temperature measuring unit-side temperature sensing element and the power supplying unit-side temperature sensing element have a heat flow path formed therebetween by the third thermal resistor.

18. The temperature measuring device according to claim 9, wherein:
- a surface of the temperature measuring unit-side temperature sensing element which is opposed to the power supplying unit-side temperature sensing element has a concave portion formed by the first thermal resistor;
- a surface of the power supplying unit-side temperature sensing element which is opposed to the temperature measuring unit-side temperature sensing element is brought into contact with a third thermal resistor comprising a convex portion that protrudes from the second thermal resistor; and
- in said close contact state, the convex portion of the third thermal resistor is fitted into the concave portion of the first thermal resistor, and the temperature measuring unit-side temperature sensing element and the power supplying unit-side temperature sensing element have a heat flow path formed therebetween by the third thermal resistor.

19. The temperature measuring device according to claim 9, wherein:
- a surface of the temperature measuring unit-side temperature sensing element which is opposed to the power supplying unit-side temperature sensing element has a concave portion formed by the first thermal resistor;
- a surface of the power supplying unit-side temperature sensing element which is opposed to the temperature measuring unit-side temperature sensing element has a third thermal resistor and a first thermal conductor stacked one on another, and the stacked first thermal conductor comprises a convex portion that protrudes from the second thermal resistor; and
- in said close contact state, the convex portion of the first thermal conductor is fitted into the concave portion of the first thermal resistor, and the temperature measuring unit-side temperature sensing element and the power supplying unit-side temperature sensing element have a heat flow path formed therebetween by the third thermal resistor and the first thermal conductor comprising the convex portion.

* * * * *